US008744882B2

(12) United States Patent  
Carey et al.

(10) Patent No.: US 8,744,882 B2  
(45) Date of Patent: Jun. 3, 2014

(54) EVENT MANAGEMENT SYSTEM

(75) Inventors: John Michael Carey, Miami Beach, FL (US); Ari Beau Staton Smith, Sunny Isles, FL (US)

(73) Assignee: 212, LLC, Pompano Beach, FL (US)

( * ) Notice: Subject to any disclaimer, the term of this patent is extended or adjusted under 35 U.S.C. 154(b) by 1007 days.

(21) Appl. No.: 12/585,683

(22) Filed: Sep. 22, 2009

(65) Prior Publication Data

US 2010/0138246 A1 Jun. 3, 2010

Related U.S. Application Data

(60) Provisional application No. 61/136,643, filed on Sep. 22, 2008.

(51) Int. Cl.
*G06Q 10/00* (2012.01)
(52) U.S. Cl.
USPC .............................................................. 705/5
(58) Field of Classification Search
USPC ................................................. 705/1.1, 5, 6
See application file for complete search history.

(56) References Cited

U.S. PATENT DOCUMENTS

| | | | |
|---|---|---|---|
| 6,240,362 B1 * | 5/2001 | Gaspard, II ................... | 701/410 |
| 6,512,964 B1 | 1/2003 | Quackenbush et al. | |
| 6,629,081 B1 * | 9/2003 | Cornelius et al. ............... | 705/30 |
| 6,675,150 B1 * | 1/2004 | Camer ......................... | 705/7.21 |
| 6,697,730 B2 * | 2/2004 | Dickerson ..................... | 701/465 |
| 6,754,634 B1 * | 6/2004 | Ho ................................. | 705/6 |
| 6,979,199 B2 | 12/2005 | Barron | |
| 7,120,928 B2 * | 10/2006 | Sheth et al. .................... | 726/4 |
| 7,603,281 B1 * | 10/2009 | Miller et al. ................... | 705/1.1 |
| 7,881,730 B2 * | 2/2011 | Sheha et al. ................ | 455/456.1 |
| 8,082,095 B2 * | 12/2011 | Sumcad et al. ................ | 701/516 |
| 8,516,047 B2 | 8/2013 | Castanho et al. | |
| 2002/0069293 A1 | 6/2002 | Natalio | |
| 2002/0072938 A1 * | 6/2002 | Black et al. .................... | 705/5 |
| 2003/0176945 A1 | 9/2003 | Tozuka et al. | |
| 2005/0182722 A1 | 8/2005 | Meyer et al. | |
| 2005/0240452 A1 * | 10/2005 | Breed et al. .................... | 705/5 |
| 2005/0258230 A1 | 11/2005 | Wiater | |
| 2005/0261980 A1 * | 11/2005 | Hadi ............................ | 705/26 |
| 2006/0145852 A1 * | 7/2006 | McElhannon et al. ..... | 340/572.1 |
| 2007/0027917 A1 | 2/2007 | Ariel et al. | |
| 2007/0039024 A1 * | 2/2007 | Krajcev et al. ................. | 725/46 |

(Continued)

FOREIGN PATENT DOCUMENTS

WO WO 02/46868 A2 6/2002

OTHER PUBLICATIONS www.airportexpress.com/sf_info.html, web archive, Jan. 19, 2008.*
www.BEstday.comTransfers/Cancun, web archive, Jan. 14, 2007.*

(Continued)

*Primary Examiner* — Shannon Campbell
(74) *Attorney, Agent, or Firm* — Andrews Kurth LLP; Aldo Noto; Matthew J. Esserman

(57) ABSTRACT

An event management system is disclosed. The event management system includes a memory, a computer display, an event creation component, a conversion mapping component that maps passenger data from a user format into an application specific format; a group scheduling component that categorizes passengers into groups, a passenger management component, a vehicle management component, a staff management component, a versioning component, an invoicing component, and a data visualization component. Also disclosed is a computerized method for event planning.

15 Claims, 39 Drawing Sheets

(56) References Cited

U.S. PATENT DOCUMENTS

| | | |
|---|---|---|
| 2007/0124059 A1 | 5/2007 | Barry et al. |
| 2007/0276706 A1 | 11/2007 | Dunsky et al. |
| 2008/0018730 A1 | 1/2008 | Roth |
| 2008/0282189 A1 | 11/2008 | Hofmann et al. |
| 2009/0037526 A1* | 2/2009 | Elliott et al. ............. 709/203 |
| 2009/0210264 A1* | 8/2009 | Anderson et al. ............. 705/5 |
| 2009/0234680 A1* | 9/2009 | Newton ............. 705/5 |
| 2009/0254844 A1* | 10/2009 | Davidson et al. ............. 715/764 |
| 2009/0319927 A1 | 12/2009 | Beeman et al. |
| 2010/0038428 A1 | 2/2010 | Chen et al. |
| 2010/0070168 A1* | 3/2010 | Sumcad et al. ............. 701/206 |

OTHER PUBLICATIONS

"Interactive Author-Assistance Tool", IBM Technical Disclosure Bulletin, May 1, 1986, US, vol. 28, Issue No. 12, pp. 5284-5286.

* cited by examiner

| | 482 | 483 | 484 | 485 | 486 | 487 | 488 |
|---|---|---|---|---|---|---|---|
| | VEHICLE | USE? | MAX | DEFAULT | CURRENT | MCO (BASE) | MCO (OV) |
| | SEDAN | Y | 4 | 2 | 2 | $0 | $0 |
| | SUV | Y | 6 | 4 | 4 | $0 | $0 |
| | VAN | Y | 14 | 9 | 9 | $0 | $0 |
| | MINI BUS | Y | 38 | 38 | 38 | $0 | $0 |

| VEHICLE |
|---|
| SEDAN |
| SEDAN |
| SEDAN |
| SEDAN |
| SEDAN |
| SEDAN |
| SEDAN |
| SEDAN |
| SEDAN |
| SHARE |
| SEDAN |
| SHARE |
| SEDAN |
| SHARE |
| SEDAN |
| SHARE |
| SEDAN |
| SHARE |
| SEDAN |

SYNCHING | OPTIONS

PERFORM PRE-SYNC ANALYSIS

MANIFEST VIEWER

MOS VERSION
ALL REQUIRED COLUMNS HAVE NBEEN FOUND.

☑ AIRPORT ☐ DEFAULT VALUE:
☑ AIRLINE ☐ DEFAULT VALUE:

UPDATING

RENAMING 0 TO LAST
RENAMING 1 TO FIRST
RENAMING 3 TO ARRFN
RENAMING 4 TO ARRDT
RENAMING 5 TO ARRDATA
RENAMING 6 TO ARRAP
RENAMING 7 TO VEHICLE
SCANNING MANIFEST DATA. 8 COLUMNS TOTAL.

ADDITIONAL OPTIONS:
☐ EXTRA PSGRS IS +1
☐ USE PREVIOUS PSGR VALUES(CAREFULL)
☒ AME IS LAST THEN FIRST

AIRLINE NAMES TO CODES
L FLIGHTS
IT DATA NOW

SYNC
○ MERGE PSGRS
◉ REPLACE PSGRS
○ ADD PSGRS
○ DELETE PSGRS

SYNC NOW — 612

| | | | FLIGHT NUM | ARRIVE DATE | ARRIVE TIME | ARRAP | VEHICLE |
|---|---|---|---|---|---|---|---|
| BARR | STEV... | | 30 | 4/20/... | 4/16/... | DAL | SEDAN |
| ARRIVAL | | | | | | DAL | SEDAN |
| HALEY | BOBBY | AA | 477 | 4/14/... | 4/16/... | DAL | SEDAN |
| HEND... | SHER... | US | 1126 | 4/17/... | 4/16/... | DFW | SEDAN |
| ARRIVAL... | | | | | | DFW | SEDAN |

YOUR ORIGINAL MANIFEST

| LAST NAME | FIRST NAME | | FLIGHT NUM | ARRIVE DATE | ARRIVE TIME | DEST | VIHICLE |
|---|---|---|---|---|---|---|---|
| DALLAS | | | | | | | |
| CASA... | THOM... | | 2368 | 4/20/... | 1:25 PM | DAL | SEDAN |
| HOLM... | MICH... | | 846 | 4/20/... | 1:45 PM | DAL | SEDAN |

*FIG. 6D*

EVENT VIEWER-Test2 ID#418 (ARRIVAL EVENT TYPE)

SHOW/HIDE EXPORT OPTIONS

EVENT LIST | | SUPPORT | LOGOUT — 615
BUILD TEMPLATE   BUILD PASSENGERS   BUILD GROUPS
UPLOAD PASSENGERS | NEW PASSENGER | FLIGHT CHECK | EMAIL LIST | UNGROUPED PASSENGERS

Test2-phil (ID#418, EVENT TYPE: ARRIVAL)

| EDIT | FIRST NAME | LAST NAME | PRIORITY | VEHICLE TYPE | AIRLINE | FLIGHT NUMBER | FLIGHT TYPE | DEPARTURE | DEP. AIRPORT | DEP. TERMINAL | ARRIVAL | ARR. AIRPORT | ARR. TERMIN |
|---|---|---|---|---|---|---|---|---|---|---|---|---|---|
| | CHRISTOPHE | ADAM | | SEDAN | AA | 394 | DOMESTIC | | | | 2/4/2009 9:45:00 AM | LGA | 2 |
| | RAFAEL | AJURIA | | SEDAN | CO | 63 | DOMESTIC | | | | 2/4/2009 2:05:00 PM | EWR | 1 |
| | SCOTT | ALLAN | | SEDAN | AA | 370 | DOMESTIC | | | | 2/1/2009 4:25:00 PM | LGA | 2 |
| | JANET | ANDERSON | | SEDAN | UA | 654 | DOMESTIC | | | | 2/3/2009 7:29:00 PM | EWR | 1 |

*FIG. 6E*

EVENT VIEWER - TEST OF NYC 3 AIRPORT ID #394 (ARRIVAL EVENT TYPE)

SHOW/HIDE EXPORT OPTIONS ——— 620

EVENT LIST | | SUPPORT | LOGOUT
BUILD TEMPLATE  BUILD PASSENGERS  BUILD GROUPS
UPLOAD PASSENGERS | NEW PASSENGER | FLIGHT CHECK | EMAIL LIST | UNGROUPED PASSENGERS
UNGROUPED PASSENGERS
START | STOP | CANCEL
TEST OF NYC 3 AIRPORT - phil (ID #394, EVENT TYPE ARRIVAL)
FLIGHT UPDATE: 89 OF 89 FLIGHTS COMPLETED. THU MAY 28 2009 16:33:28 EDT
FLIGHT UPDATE TIME WINDOW: 60 phil: USER
LAST LOGIN: 5/27/2009 4:53:54 PM
LICENSE EXPIRES: 11/23/2009

| | ARRIVAL STATUS | AIRLINE | FLIGHT | DEPARTURE AIRPORT | DEPARTURE | ARRIVAL AIRPORT | ARRIVAL | PASSENGER LIST |
|---|---|---|---|---|---|---|---|---|
| ☑ | UPDATED | UA | 680 | ORD | 6/11/2009 12:00:00 PM | LGA | 6/11/2009 3:18:00 PM | RICHARD FERINA |
| ☑ | UNABLE TO LOCATE THE FLIGHT. | | | | | EWR | 6/14/2009 10:00:00 PM | MIKE BAILEY |
| ☑ | TIME WINDOW EXCEEDED (1:10PM) | CX | 830 | | | JFK | 6/15/2009 12:10:00 AM | PIERRE GAY, PIERRICK GUILLOT |

EVENT VIEWER - MEETING PHX, ID #320 (ARRIVAL EVENT TYPE)

SHOW/HIDE EXPORT OPTIONS

EVENT LIST | | SUPPORT | LOGOUT  
BUILD TEMPLATE   BUILD PASSENGERS   BUILD GROUPS  
NEW GROUP | ASSIGN PASSENGERS TO VEHICLE GROUPS  
CALCULATE | SAVE | CANCEL  
MEETING PHX - PHIL (ID #320_EVENT TYPE ARRIVAL phil: USER  
LAST LOGIN: 5/27/2009 4:53:54 PM  
LICENSE EXPIRES: 11/23/2009

PICKUP WINDOW          CALCULATED GROUPS

623 — TIME [16]  
☐ SEPERATE FLIGHTS

PICKUP TIME BUFFER

⊙ SHIFT PICKUP FORWARD  
○ SHIFT PICKUP BACK  
DOMESTIC [0]  
INTERNATIONAL [35]  
            624

TOTAL: (76) $0.00  
SEDAN: (62) $0.00    SUV: (11) $0.00    VAN: (3) $0.00

| NAME | AIRPORT | TERMINAL | VEHICLE TYPE | PASSENGERS | PICKUP DATE/TIME | PRICE |
|---|---|---|---|---|---|---|
| GROUP 1 | JFK | 1 | SEDAN | FRANCIS LAUDETTE AF 12 INTERNATIONAL 6/7/2009 12:45:00 PM | 6/7/2009 1:20:00 PM | $0.00 |
| GROUP 2 | JFK | 1 | SEDAN | ROMAIN RICHARD CX 830 INTERNATIONAL 6/7/2009 1:10:00 PM | 6/7/2009 1:45:00 PM | $0.00 |

*FIG. 6G*

COASTAL LIMOUSINE | GROUP & EVENT MANAGEMENT  *LOGOUT*

ADMINISTRATIVE TOOLS: <EVENTS> <USERS> <AIRPORTS> <AIRLINES>

701 / 702 / 703 / 704 / 705

EVENTS

<NEW EVENT> <DELETE EVENT(S)>

| ☐ | NAME | CUSTOMER | START | END | |
|---|------|----------|-------|-----|---|
| ☐ | MEDICAL ADVISORY GROUP | GEP SOUTH FLORIDA | 7/27/2008 | 7/31/2008 | EDIT |
| ☐ | PRIDE ARRIVAL | GEP SOUTH FLORIDA | 8/5/2008 | 8/9/2008 | EDIT |
| ☐ | DEMO MANIFEST | TRISTAR WORLDWIDE | 8/4/2008 | 8/14/2008 | EDIT |
| ☐ | PRIDE ARRIVAL FORECAST | GEP SOUTH FLORIDA | 8/5/2008 | 8/13/2008 | EDIT |
| ☐ | DEMO 9 | OSELECT ACC | 8/27/2008 | 9/3/2008 | EDIT |
| ☐ | DEMO | HELLO FLORIDA | 8/28/2008 | 9/4/2008 | EDIT |
| ☐ | DEMO2 | HELLO FLORIDA INC. | 8/28/2008 | 9/4/2008 | EDIT |
| ☐ | ABC | OSELECT ACC | 9/3/2008 | 9/10/2008 | EDIT |

FIG. 7A

COASTAL LIMOUSINE GROUP & EVENT MANAGEMENT *LOGOUT*

ADMINISTRATIVE TOOLS: <EVENTS> <USERS> <AIRPORTS> <AIRLINES>

EVENT INFORMATION

<BACK TO EVENT LIST>

| EVENT DETAILS — 706 | |
|---|---|
| DETAILS | |
| CUSTOMER NAME | TRISTAR WORLDWIDE ▽ |
| EVENT NAME | TRISTAR MEDICAL MANIFEST |
| EVENT CODE | TMM001 |
| START DATE | 9/4/2008 |
| END DATE | 9/5/2008 |
| CONTRACT NAME | BEAU SMITH |
| CONTRACT PHONE # | 212-555-1212 |
| EVENT TYPE | AIRPORT PICK-UP ▽ |
| DEFAULT RUN TYPE | ARRIVAL ▽ |
| | |
| OPTIONS | ☐ USE EVENT PRICING |
| | ⦿ ASSIGN SAME RES# TO ALL TRANSACTIONS |
| | ○ ASSIGN DIFFERENT RES# TO ALL TRANSACTIONS |

*FIG. 7B*

COASTAL LIMOUSINE  GROUP & EVENT MANAGEMENT  *LOGOUT*

ADMINISTRATIVE TOOLS: <EVENTS> <USERS> <AIRPORTS> <AIRLINES>

EVENT INFORMATION

<BACK TO EVENT LIST>

FLIGHT STATUS HAS NOT BEEN VALIDATED FOR 16 PASSENGERS.

| EVENT DETAILS | PASSENGERS | GROUPS | VEHICLES | STAFF | VERSIONS | GENERATE INVOICE | VIEW STATISTICS |
|---|---|---|---|---|---|---|---|
| 707 | 708 | 709 | 710 | 711 | 712 | 713 | 714 |

PASSENGERS

<UPLOAD PASSENGERS> <ADD NEW PASSENGERS> <DELETE PASSENGER(S)> <UPDATE FLIGHT TIMES> <EXPORT PAX TO EXCEL> <EXPORT GT3>

715

| | FIRST NAME | LAST NAME | PAX INFO | PRIORITY | VEHICLE TYPE | AIRPORT | TERMINAL | AIRLINE CODE | FLIGHT NUMBER | ARRIVAL | FLIGHT STATUS | PICKUP DATE/TIME | GROUP |
|---|---|---|---|---|---|---|---|---|---|---|---|---|---|
| ☐ | ANNETTE | ACOSTA | VIP | VIP | SEDAN | FLL | 1C | CO | 1648 | 9/4/2008 7:35:00 PM | UNKNOWN | | |
| ☐ | MARIA | ACCOSTA | | | SEDAN | FLL | 2 | AA | 2071 | 9/4/2008 1:00:00 PM | UNKNOWN | | |
| ☐ | SHERYL | ADAMS | VIP | VIP | SEDAN | PBI | C | DL | 1497 | 9/4/2008 5:36:00 PM | UNKNOWN | | |
| ☐ | MAUREEN | ALBRECHT | | | SEDAN | FLL | 2 | AA | 2071 | 9/4/2008 | UNKNOWN | | |

*FIG. 7C*

COASTAL LIMOUSINE | GROUP & EVENT MANAGEMENT *LOGOUT*
ADMINISTRATIVE TOOLS: <EVENTS> <USERS> <AIRPORTS> <AIRLINES>

PASSENGER

| | |
|---|---|
| EVENT NAME | TRISTAR MEDICAL MANIFEST |
| CUSTOMER NAME | TRISTAR WORLDWIDE |
| FIRST NAME | Jc |
| LAST NAME | Carey |
| VIP | ☑ |
| SITE INSPECTOR | ☐ |
| PRIORITY | |
| VEHICLE TYPE | SEDAN |
| AIRPORT | FORT LAUDERDALE(FLL) |
| TERMINAL | 1C |
| AIRLINE | CONTINENTAL(CO) |
| FLIGHT NUMBER | 1648 |
| ARRIVAL DATE | 9/4/2008 |
| ARRIVAL TIME | 8 : 35  PM |
| FLIGHT STATUS | UPDATED |

COASTAL LIMOUSINE   GROUP & EVENT MANAGEMENT *LOGOUT*

ADMINISTRATIVE TOOLS: <EVENTS> <USERS> <AIRPORTS> <AIRLINES>

EVENT INFORMATION

< BACK TO EVENT LIST >

| EVENT DETAILS | PASSENGERS | GROUPS | VEHICLES | STAFF | VERSIONS | GENERATE INVOICE | VIEW STATISTICS |

GROUPS

<SCHEDULE GROUPS><ADD NEW GROUP><DELETE GROUP(S)><EXPORT GROUP TO EXCEL>

COST: $690.08  TOTAL: 7
SEDAN: 5  SUV: 2  LIMO: 0  VAN: 0  STRETCH SUV: 0  MINI BUS: 0  MOTOR COACH: 0

| NAME | AIRPORT | TERMINAL | VEHICLE TYPE | PASSENGERS | PICKUP DATE/TIME |
|---|---|---|---|---|---|
| ☐ GROUP 1 | FLL | 2 | SUV | MARIA ACOSTA AA 2071 9/4/2008 8:00:00AM<br>MAUREEN ALBRECHT AA 2071 9/4/2008 8:00:00AM<br>PATRICK BARBERA AA 2071 9/4/2008 8:00:00 AM<br>BEAU SMITH AA 2071 9/4/2008 8:00:00AM | 9/4/2008 8:00:00 AM |
| ☐ GROUP 2 | FLL | 3E | SEDAN | COLLEEN BALCO US 1997 9/4/2008 8:54:00AM | 9/4/2008 8:54:00 AM |
| ☐ GROUP | MIA | MAIN | SEDAN | ROSE ARLIA AA 599 9/4/2008 1:45:00 PM | 9/4/2008 1:45:00 PM |

*FIG. 7F*

COASTAL LIMOUSINE  GROUP & EVENT MANAGEMENT  LOGOUT
ADMINISTRATIVE TOOLS: <EVENTS> <USERS> <AIRPORTS> <AIRLINES>

EVENT VEHICLE                                         CAPACITY

EVENT NAME        TRISTAR MEDICAL MANIFEST            MAX:        3
CUSTOMER NAME     TRISTAR WORLDWIDE                   SUGGESTED:  3
VEHICLE NAME      SEDAN                               CURRENT:    2
VEHICLE CODE      SEDAN
INVENTORY         40

CUSTOM RATES —727
DELETE RATE(S)
NO RATES IN THE LIST

ADD RATE —728

AIRPORT: ATL ▽  PRICE: [    ]  ADD RATE

<UPDATE VEHICLE><BACK TO EVENT>
         729

*FIG. 7G*

TERMINAL IMAGE
FT. LAUDERDALE HOLLYWOOD INTERNATIONAL AIRPORT (FLL) — 730

| | |
|---|---|
| GROUP NAME | GROUP 1 |
| CUSTOMER NAME | TRISTAR WORLDWIDE |
| EVENT NAME | TRISTAR MEDICAL MANIFEST |
| AIRPORT | FORT LAUDERDALE (FLL) |
| TERMINAL | 2 |
| PICKUP DATE | 9/4/2008 |
| PICKUP TIME | 08 : 00 AM |
| GROUP TIME WINDOW | 15 |
| VEHICLE TYPE | SUV |
| REQUESTED CHAUFFEUR | |
| MAX CAPACITY | 5 |
| REMAINING CAPACITY | 1 |
| PRICE | $98.80 |
| DISTANCE | 11 MILES |
| TIME | 18 MIN |

1. DEPART START ON LOCAL ROAD(S) (WEST) (DISTANCE: 0.25 MILES; DURATION: 0 MINUTES)
2. BEAR RIGHT (WEST) ONTO SW 41st CT [LEE WAGENER BLVD] (DISTANCE: 0.12 MILES; DURATION: 1 MINUTE) 3. TURN LEFT (SOUTH) ONTO SW 12th TERRACE THEN IMMEDIATELY TURN RIGHT ONTO

*FIG. 7H*

COASTAL LIMOUSINE  GROUP & EVENT MANAGEMENT  LOGOUT
ADMINISTRATIVE TOOLS: <EVENTS> <USERS> <AIRPORTS> <AIRLINES>

EVENT STAFF

EVENT NAME         TRISTAR MEDICAL MANIFEST

CUSTOMER NAME      TRISTAR WORLDWIDE

LOCATION

MEETING POINT

WORKER TYPE        DRIVER GREET

COST

START DATE

END DATE

DAILY START TIME   01 ▸  00 ▸  PM ▸

DAILY END TIME     01 ▸  00 ▸  PM ▸

REQUIREMENTS

<UPDATE VEHICLE><BACK TO EVENT>

*FIG. 71*

EVENT MANAGEMENT SYSTEM

RELEVANT APPLICATION

This application claims priority to U.S. Provisional Application Ser. No. 61/136,643, filed Sep. 22, 2008, which is hereby incorporated by reference in its entirety.

TECHNICAL FIELD

This invention is directed towards optimizing the process of forecasting, budgeting, planning and manipulating information used to manage an event or group movement.

BACKGROUND

An event or group movement includes the forecasting and management of a group of people that will arrive from numerous domestic and/or international locations at various times on various days via commercial flights, private jet aviation, train, bus, car service, or personal transportation. Upon the arrival of the entire group it is very common that corporate events will occur that require the logistical coordination of transporting the group to and from each planned event. Once the event has ended each person will require coordination to return to their destination city; this can take place over a period of days or within a few hours on the same day.

One of the problems encountered by the corporate travel and event management industries with regard to large events is the coordination and management of the ground transportation and greeting services for the event. For a large event such as a company meeting or a company retreat numerous individuals from various geographical locations travel to the city in which the event will take place. In many instances, there is more than one airport which may service the event location. For each of these airports there are usually many airline carriers and multiple terminals in which travelers may arrive. In order for greeters to be scheduled to meet travelers at the time of arrival at the gate for the particular terminal and for travelers to be met by a chauffeur in a scheduled vehicle provided by a ground transportation company, someone must coordinate and solve the problem of hundreds of travelers arriving and departing at different terminals at both scheduled and unscheduled times. Typically the variables involved with solving this problem are the particular airport they will arrive or depart from, terminal of arrival or departure, scheduled time of arrival or departure, any change in scheduled flight time, number of individuals arriving at or departing from a particular terminal during that particular time period, and the number of travelers a greeter or a ground transportation vehicle can accommodate. With hundreds of travelers, multiple airport arrivals and departures at various terminals, flight delays, it is difficult for someone to schedule ground transportation vehicles and greeters.

An example of such an event and scenario would be as follows: an event is located in the Washington, D.C. area, hundreds of travelers would be traveling by air to three different airports (i.e., the Baltimore Washington Airport, Dulles Airport and National Airport), each of these airports have multiple terminals for planes to arrive. The ground transportation which will move the travelers from each of the three airports to the event location which may be in a hotel in downtown Washington, D.C., could be accomplished with various types of vehicles including sedans, limousines, SUV's, vans, minibuses, and motor coaches. Each of these vehicle types has a different capacity for carrying passengers. In order to assess which vehicle type would be used for a given pick-up at a particular terminal at a particular airport the scheduler needs to identify and group passengers that are arriving at approximately the same time in the same terminal. The scheduling is exasperated by the fact that planes may arrive early or later than scheduled, and certain vehicle types may be unavailable if stuck in traffic or still handling a previous pick-up. Other variables may also complicate solving the transportation problem such as certain passengers being VIPs and requiring separate cars or special vehicles for their transportation.

Additional challenges occur when people are arriving and departing at the same time on scheduled domestic and customs flights that require check in two hours prior to departure and an undetermined amount of time to go through customs on arrivals.

Similar issues exists with the scheduling of greeters to meet passengers on their arrival at airport terminals and direct passengers to baggage claims and vehicles. For example, depending upon the number of passengers arriving at a particular time in a particular terminal, multiple greeters may be necessary to direct the passengers to the appropriate vehicles for transportation to the event and location. Determining if a flight is arriving as a customs flight will also complicate the process and requires additional scheduling.

Assigning and managing the ground transportation can be considerably complex especially if there is a limited fleet of vehicles that are being used to transport the passengers. Determining the most efficient or optimal way to assign the vehicles and move the passengers can be difficult given all the variables that are involved in scheduling.

When a company plans a company event they may have an internal person or department responsible for managing the event, they may outsource the event to a corporate travel company or utilize the services offered by a destination management company (DMC). These people or departments will be referred to as the "Travel Manager". Depending upon the number of attendees and geographic locations selected the Travel Manager will provide a rough ballpark estimate of the costs of the event. Typically ground transportation services are estimated as a percentage of the total cost for the event. e.g., 10%. Sometimes, the ground transportation service costs are estimated based upon the ground transportation cost for a prior event or an event which occurred in a prior year. A detailed calculation of the actual cost of the ground transportation is not typically done because it requires too many hours of manual labor by the Travel Manager.

Once the decision to have an event is made, the planning generally progresses to the next step, and the company event's person will generate a manifest of passenger attendees along with information about arrival and departure times and airlines for those passengers as well as any activities, events or dine-arounds that will require transporting the group during the event days. This manifest list is provided to the Travel Manager for their use in estimating the cost of the ground transportation. Upon receipt of the manifest the Travel Manager will typically begin a very labor intensive process of reformatting the spreadsheet to identify what days and times people are scheduled to arrive and depart and from what airport and terminal and begin a very crude grouping or assignment of passengers to vehicles. This process usually takes at least several hours and does not verify or validate information or account for any changes. Once the travel manager has completed the initial forecasted manifest, the travel manager will forward it to the local ground transportation provider which will then estimate the ground transportation costs. Typically this is a very rough cost and does not account for invalid information, changes, or optimized grouping calculations. Due to the overwhelming amount of changes and grouping variations it is very common that the quote is completely different than the actual cost. This can result in a lost opportunity to win the business or illustrate the opportunity to optimize the groupings and decrease ground transportation cost.

In addition to the ground transportation portion of the event management, the hotels involved in the event management do not have detailed information about arrival time of guests at the hotel or check out times for guests departing from the hotel.

Organizing the movement of passengers from one location to another is a complicated, time-consuming and error-prone process. There are many instruction manuals, help guides, books, time management software and seminars that provide event planning guidance. However, these tools amount to little more than common sense organizational techniques and a laundry list of "to-do" checklists.

There is a strong need to have an event management system for automating the repetitive and labor-intensive parts of the event management process, validating, verifying and automatically correcting passenger information, providing real-time pricing for rapid invoice forecasting, and automating grouping of passengers into vehicles based upon a multitude of user and system defined factors. A system for allowing better scheduling of ground transportation and providing hotels with better information of travelers arrival times is needed.

SUMMARY

An event management system which includes computer processors for use in the travel industry is disclosed. The event management system includes a memory, a computer display, an event creation component wherein a new event is identified including a name of the event, a sponsor of the event, a location and a contact person for the event, a conversion mapping component wherein passenger data including names of passengers and flight information is mapped from a user format into an application specific format, a passenger management component wherein mapped passenger data is deleted and changed and wherein a new passenger is added, a vehicle management component wherein vehicle types are selected and a capacity of passengers for a vehicle type is modified, a group scheduling component wherein passenger data, flight information, the vehicle types and the vehicle capacity for a vehicle type are processed and passengers are categorized into groups and placed in a service time, a staff management component, wherein staff are allocated to an event including greeters and drivers, wherein the staff's location and time of service are determined using the groups, a versioning component wherein a first and a second version of the event including information on the groups is stored in the memory, an invoicing component wherein invoices related to the event are generated, and a data visualization component, wherein information about the event is formatted for viewing on a computer and a signal carrying output data is sent to the computer display.

Also disclosed is a computer program product to assist in event management. The computer program product includes a computer readable medium and computer readable code embodied on the computer readable medium for event management. The computer readable code includes: computer readable program code devices configured to enable a processor to obtain information about an event including an event name, a sponsor, and a location, computer readable program code devices configured to enable a processor to convert a passenger manifest from one format to another, computer readable program code devices configured to enable a processor to change the converted passenger manifest, computer readable program code devices configured to enable a processor to effect a selection of vehicle types and capacity of vehicles, computer readable program code devices configured to enable a processor to categorize passengers into groups and identifying an expected service time by processing flight information, the vehicle types, and the vehicle capacity, computer readable program code devices configured to enable a processor to effect storing of passenger information and the passenger groups, computer readable program code devices configured to enable a processor to forecast a budget based on a price for the movement of one or more of the vehicle types, and computer readable program code devices configured to enable a processor to effect the display of the forecast budget and information about the event.

Also disclosed is a computerized method for use in event planning. The method includes obtaining information about an event including an event name, a sponsor, and a location, converting, using a computer, a passenger manifest from one format to another, processing changes to the converted passenger manifest, allowing a user to select more than one vehicle type and a capacity for a selected vehicle type, determining groups for passengers and identifying an expected service time for each group by processing flight information, the vehicle types, and the vehicle capacity, storing of passenger information and the passenger groups in a database, forecasting, using a computer, a budget based on a price for the movement of one or more of the vehicle types, and displaying the forecasted budget and information about the event.

BRIEF DESCRIPTION OF THE DRAWINGS

FIG. 3B is an exemplary screen shot showing an uploaded manifest with no headers FIG. 3C is an exemplary screen shot showing the mapping of the full name column.

FIG. 3D is an exemplary screen shot showing the mapping of the arrival airport column.

FIG. 3E is an exemplary screen shot showing the mapping of the arrival flight number column.

FIG. 3F is an exemplary screen shot showing the mapping of the arrival date and time columns.

FIG. 3G is an exemplary screen shot showing a completely mapped manifest.

FIG. 3H is an exemplary screen shot showing how to manually update a manifest.

FIG. 4F shows an exemplary screen shot of an user interface page of the group scheduling program.

FIG. 4H shows a screen shot for vehicle management.

FIGS. 6A-6I are screen shots of an embodiment of the event management system.

FIGS. 7A-7I are screen shots of another embodiment of the event management system.

DETAILED DESCRIPTION

An event management system that optimizes passenger manifests for use by destination management, event planning, livery and other types of transportation companies is described herein. The event management system allows users to effectively plan, analyze, design, forecast, and modify all types of groups and events and substantially reduces the time planners spend manipulating manifests for both budgeting and ground transportation optimization. The event management system will allow planners to reduce the time they spend on generating manifests by as much as 90%. The saving in time alone will allow the user to focus their attention on other aspects of the meeting. Event planning mistakes will be substantially reduced during multilevel manifest manipulation. In addition to the time savings, the event management system will catch and correct mistakes from the onset within a given manifest also, and check flights instantaneously without visits to multiple airline websites.

The event management system can be a local system, a web-based system or a hybrid system. These systems will generally have one or more processors and one or more memory devices. In an embodiment, the event management system comprises software programs that resides locally in a computer. The software is supported by a web-based database and web service calls. The software program is designed to upload a raw manifest and allow the user to manipulate the data based on multiple criteria. Planners can use the solution for budgeting and estimating. End users can select vehicle types and number of passengers while pricing and manipulating the criteria to fit their specific requirements. VIPs can be identified and handled according their special needs.

Figure 1A:
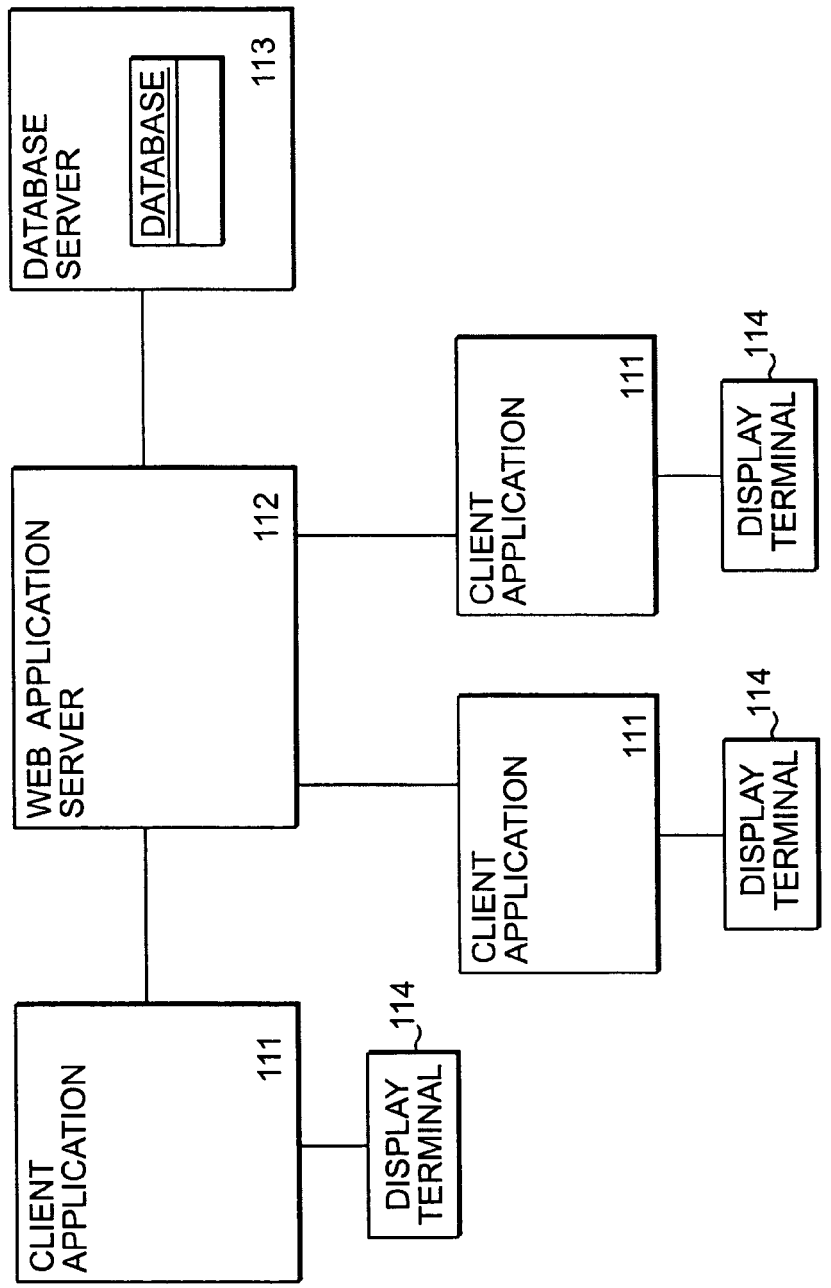
FIG. 1A is a hardware diagram of an embodiment of an event management system.

The event management system lowers transportation costs by optimizing transportation expenses through grouping attendees based on multiple criteria. The event management system allows users to set budgets in real-time, without relying on estimates, FIG. 1A shows the hardware components of an embodiment of a hybrid event management system 100. In this embodiment, the hardware components include: client terminals 111, a web application server 112, and a database server 113. Each client terminal 111 houses a client application software that include the application code, business logic, and business rules that run and govern the client terminal 111. Each client terminal 111 also include a client interface 114 from which the requests for application services are originated. The client terminals 111 can take on a variety of forms including desktop PC, a laptop, PDA, blackberry, cell phones, and other portable devices. The web application server 112 provides web services, such as integration with FlightView® or other flight system to ascertain accurate flight information as well as integration with Microsoft Virtual Earth to identify accurate address look ups and mileage and distance between hotels and airports that support the event management system 100 and supplies security for the Event Management System 100. The database server 113 houses the mapped passenger manifest data and a database containing the flight information from the various airlines in order to verify and update the accuracy of the flight information for each passenger. Flight information is updated periodically through web service calls and the updated flight information is then stored in the database.

Figure 1B:
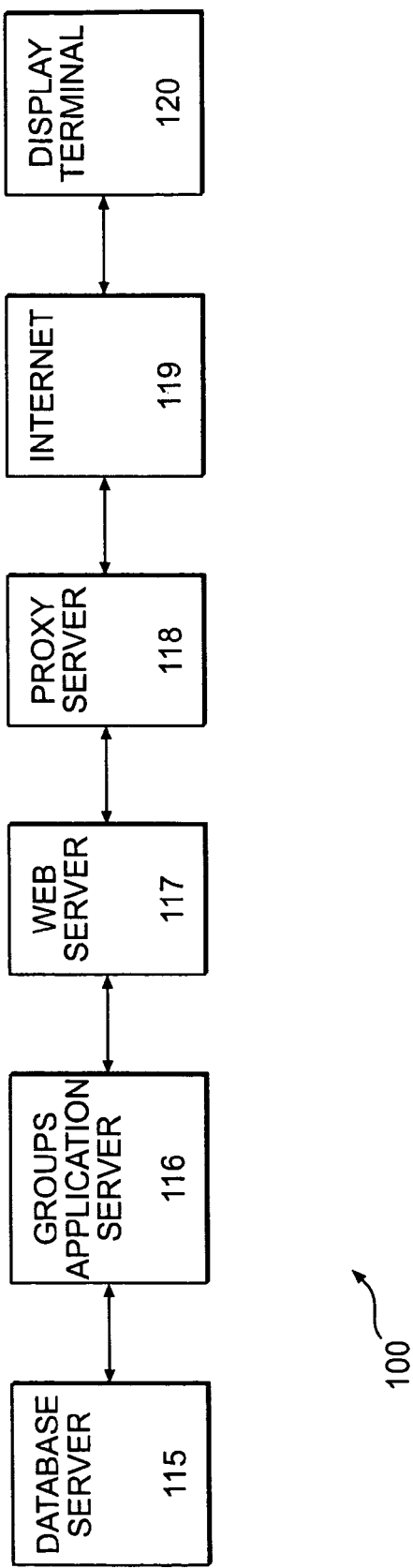
FIG. 1B is a hardware diagram of another embodiment of an event management system.

FIG. 1B shows the hardware components of an embodiment of a web-based event management system 100'. The hardware components include, but are not limited to, a database server 115, a groups application server 116, a web server 117, a proxy server 118, the Internet 119 and display terminals 120. In this embodiment, the database server 115 houses the mapped passenger manifest data. The groups application server 116 houses the software for event management tools, which include application code, business logic, and business rules that run and govern the groups application server 116. The web server 117 and proxy server 118 support the event management system 100' and supply security for the event management system 100' and access to the Internet 119. The Internet 119 is used for a variety of functions including the auto validation feature which requires accessing of a database containing the flight information from the various airlines in order to verify and update the accuracy of the flight information for each passenger. The display terminals 120 are where the requests for application services originate. The display terminals 120 can take on a variety of forms including desktop PC, a laptop, PDA, blackberry, cell phones, and other computers and portable devices.

Figure 2:
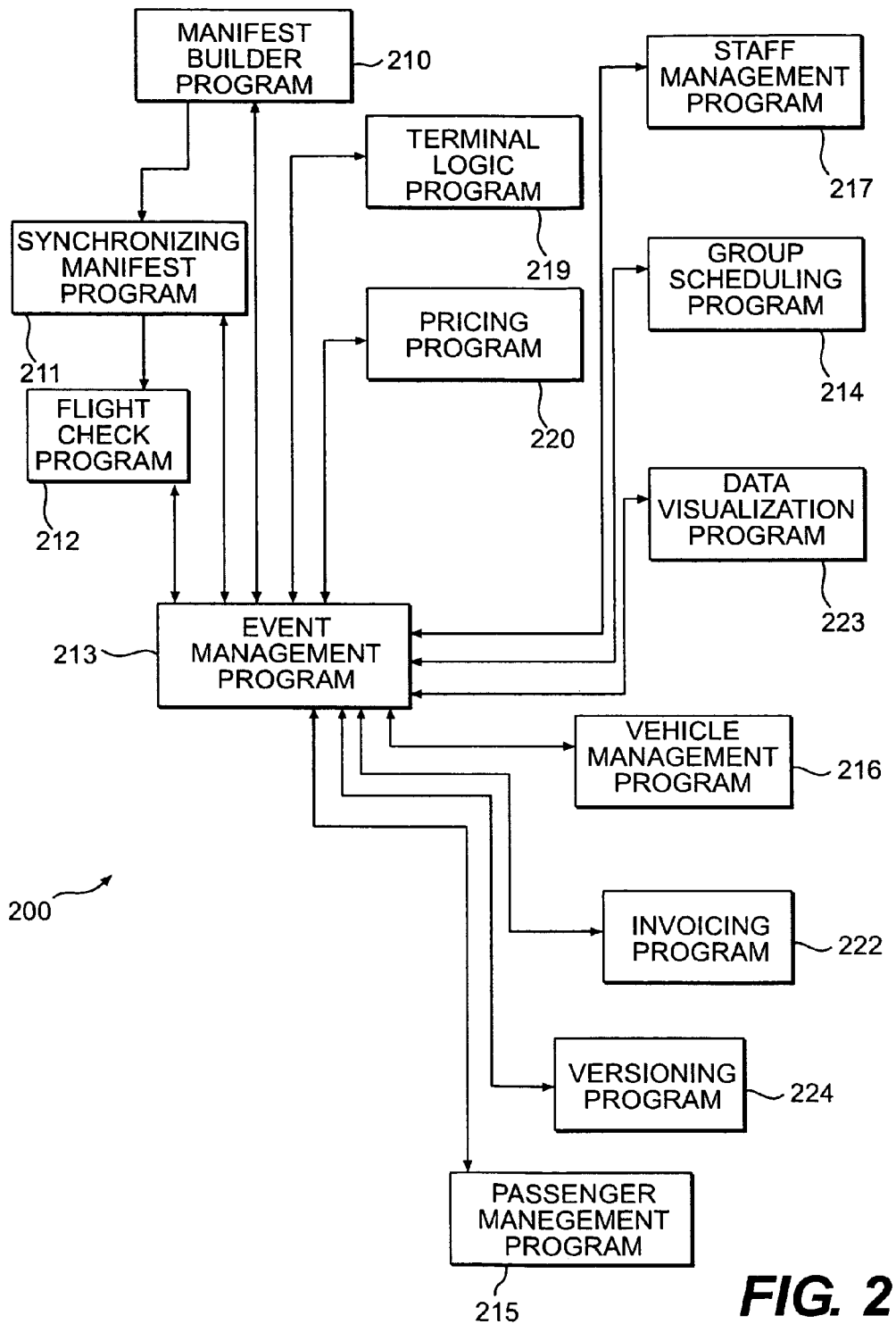
FIG. 2 is a software diagram of one embodiment of the event management system.

FIG. 2 depicts software 200 involved in one embodiment of the event management system 100. The primary components in this embodiment of the software 200 include, but are not limited to: manifest builder program 210, manifest synchronization program 211, flight check program 212, event management program 213, group scheduling program 214, passenger management program 215, vehicle management program 216, staff management program 217, shuttle program 218, terminal logic program 219, pricing program 220, budget and forecasting program 221, invoicing program 222, data visualization program 223, and versioning program 224.

The Manifest Builder Program

The manifest builder program 210 provides the ability to manage the event from the inception. Gathering the information for all participants of a group movement is very time consuming, frustrating, and typically delivers a result that has many challenges with the integrity and accuracy of the data. When a user elects to utilize the event management system 100, the user may create a distribution or e-mail list. One feature of the manifest builder program 210 will automatically send out a customized email template that is designed to be sent back from each participant accompanied with their entire travel arrangements. This information may contain flight information and data that goes far beyond the ground transportation requirements, such as the length of hotel stay, activity selection, meal selection, etc. The manifest builder program 210 has a user interface that allows a group coordinator to view how many people were sent the request for information or e-mail template, how many people read the email, how many people responded, how many people had any missing information, etc. The information collected will be in a desired format (e.g., as excel files) for processing by the event management system 100.

The Manifest Synchronization Program

The manifest synchronization program 211 allows a user to synchronize a passenger manifest with the Event Management System 100, i.e., to map a passenger manifest into the Event Management System 100. This program includes some automatic correction and compatibility features. The program allows the user to use a new or existing "map" that defines how the system should import a variety of column-structured manifest file formats (e.g., Excel formatted files), associate the columns of that file to the fields in the system, and perform a number of preprocessing actions on the passenger data. The preprocessing actions may include changing the case of the names, automatically correcting airline names, verifying that all of the required data is present for each passenger, removing suffixes, prefixes, middle names, adjusting dates and times to start date of event, randomizing times for forecasting purposes, automatically create new vehicle types in the "Vehicle Management Program" and adding saved maps to templates that can be shared with other users.

Figure 3A:
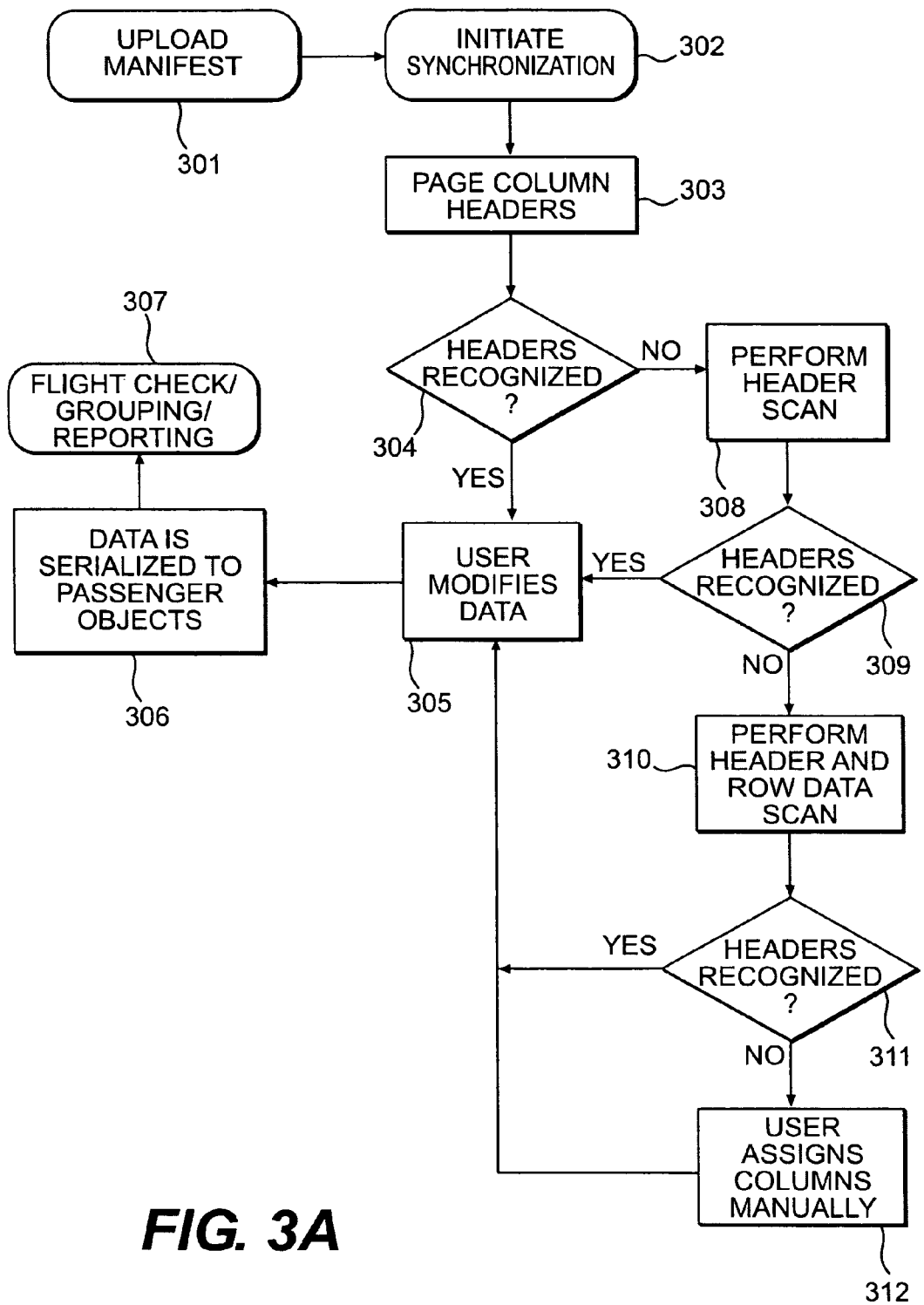
FIG. 3A is a flowchart of the manifest synchronization process.

Referring now to FIG. 3A, shown is an embodiment of a manifest synchronization program 211 for the event management system 100. Briefly, the manifest synchronization program 211 processes the required data (i.e., first name, last Name, arrival date, arrival time, arrival airport, arrival airline, arrival flight number, departure date, departure time, departure airport, departure airline and departure flight number, etc.) in a manifest. If any of the required information is not provided or invalid, the program will not be able to proceed to the following step without addressing the challenges. The program auto detects each of the above, mentioned criteria by mapping each respective data set from the original manifest and qualifying the data to allow the user to proceed to the next step.

As shown in FIG. 3A, the first step of the synchronization process is to upload (subroutine 301) a manifest that is created either inside (e.g., by the manifest builder program 210) or outside the event management system 100 (e.g., by a passenger or Travel Manager holding the event). In this embodiment, the required data to process a manifest is First Name, Last Name, Date, Time, Airport, Airline, and Flight #. If there is no manifest to begin from then the data will have to be manually entered. The manifest would normally take the form of a detailed passenger manifest and may be in a variety of computer formats including excel spreadsheets and word documents. In a preferred embodiment, the manifest is a spread sheet created in Excel.

Once uploaded, the program will initiate synchronization (subroutine 302) to map the passenger manifest into the event management system 100. The program will parse column headers of the manifest (subroutine 303). The headers are first scanned to match the names, if that does not work, then the system will determine the suggested correct column from the headers and cell data. If headers are recognized (subroutine 304), the program will allow the user to modify the data in the manifest (subroutine 305). The data is then serialized to passenger objects (subroutine 306) and used by other programs for a variety of purposes, such as flight check, grouping and reporting (subroutine 307). If no headers are recognized, the program will perform a header scan in the uploaded manifest (subroutine 308) If the headers are recognized by the header scan (subroutine 309), the program will proceed to subroutine 305 and offer the user an opportunity to modify the manifest. If no headers are recognized by the header scan, the program will perform a more extensive header and row data scan (subroutine 310). If the headers are recognized by the header and row data scan (subroutine 311), the program will again proceed to block 305 and offer the user an opportunity to modify the manifest. If no headers are recognized by the header and row data scan, the program will request the user to manually assign a header to each columns (subroutine 312). The program will then proceed to subroutine 305 and the data is serialized to passenger objects (subroutine 306) and used by other programs for a variety of purposes, such as flight check, grouping and reporting (subroutine 307). Until the data is serialized, it is in a temporary status that will be reassigned from the cells of the excel spreadsheet to the object in the system.

Figure 3B:
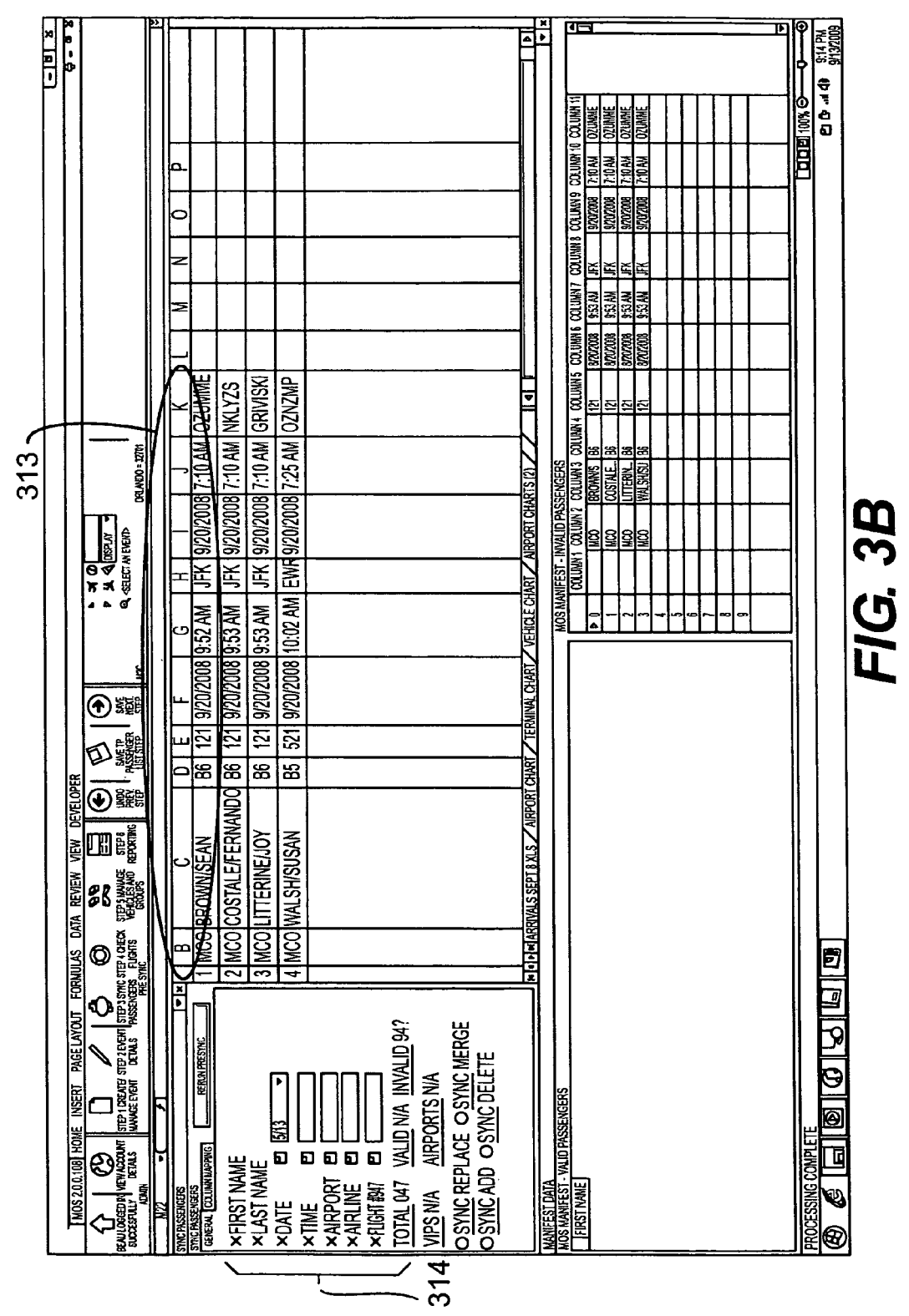

FIG. 3B shows an exemplary screen shot where an uploaded manifest has no headers. The manifest synchronization program 211 will not be able to intuitively suggest the mapping of each column to the required data for First Name, Last Name, Date, Time, Airport, Airline and Flight Number. When attempting to parse the headers and no headers 313 are recognized, the manifest synchronization program 211 will mark the required data fields with an X 314. The manifest synchronization program 211, however, will allow a user to manually map each column of the manifest into the system by assign a pre-determined header to each column.

Figure 3C:
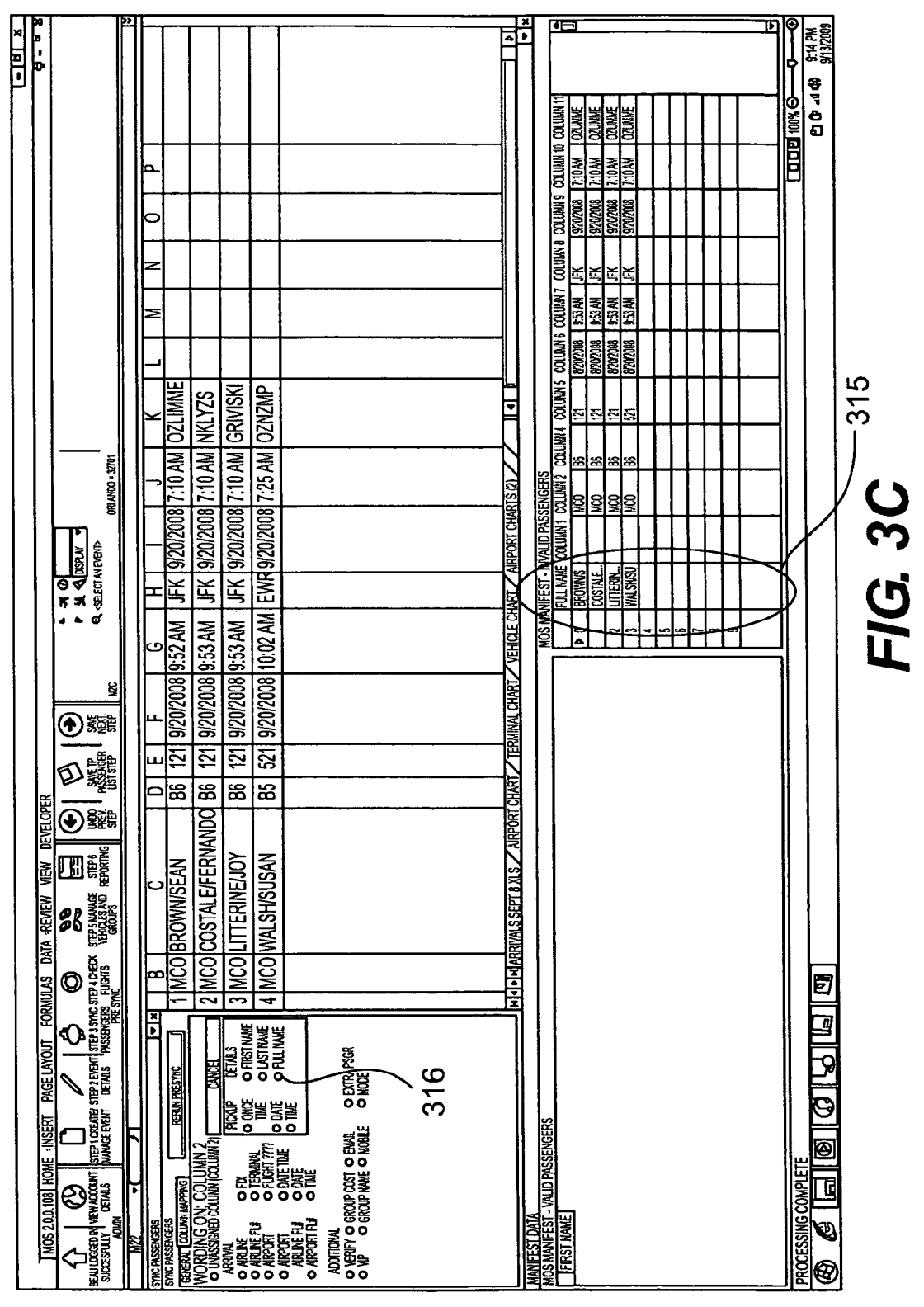
Figure 3D:
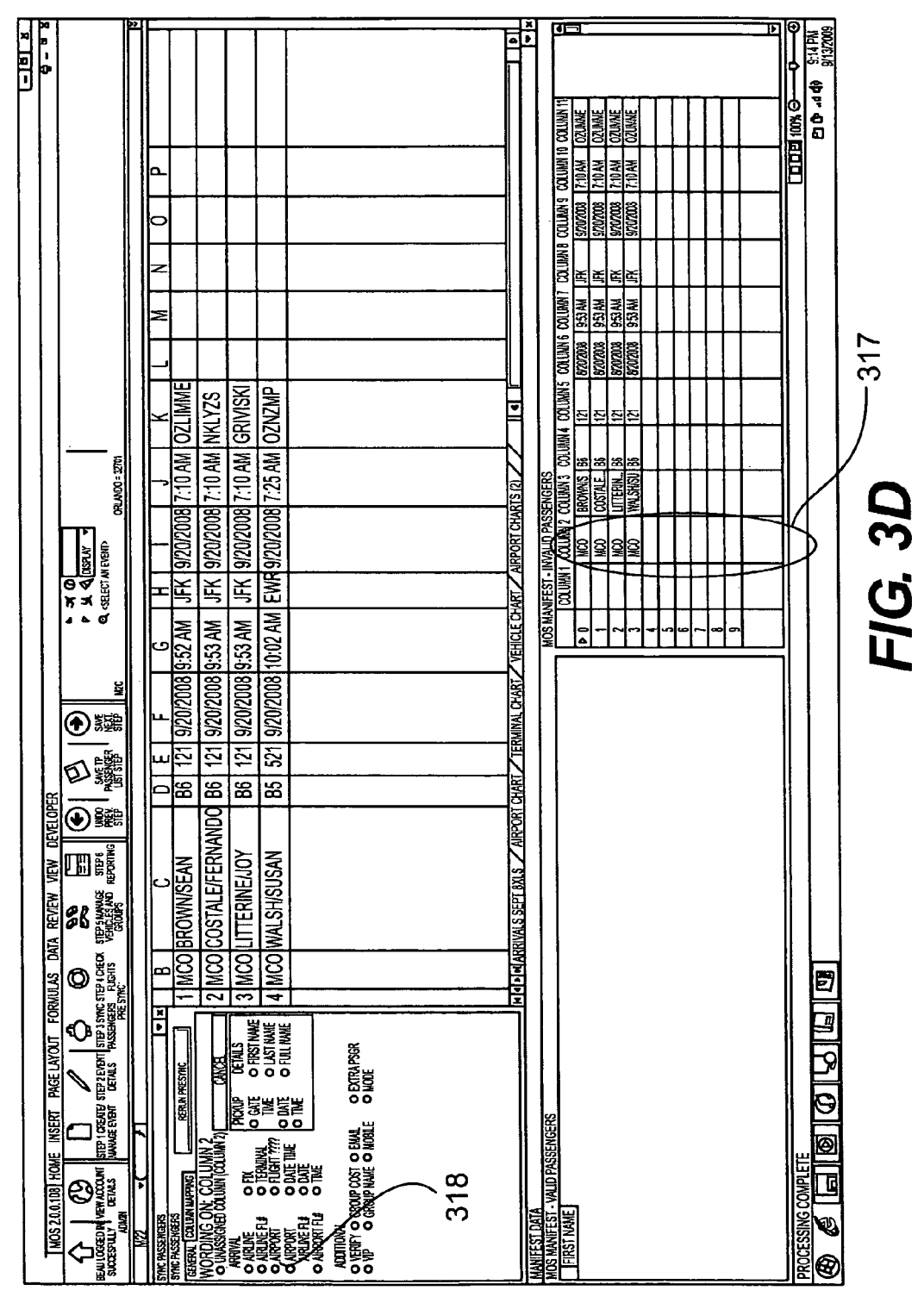
Figure 3E:
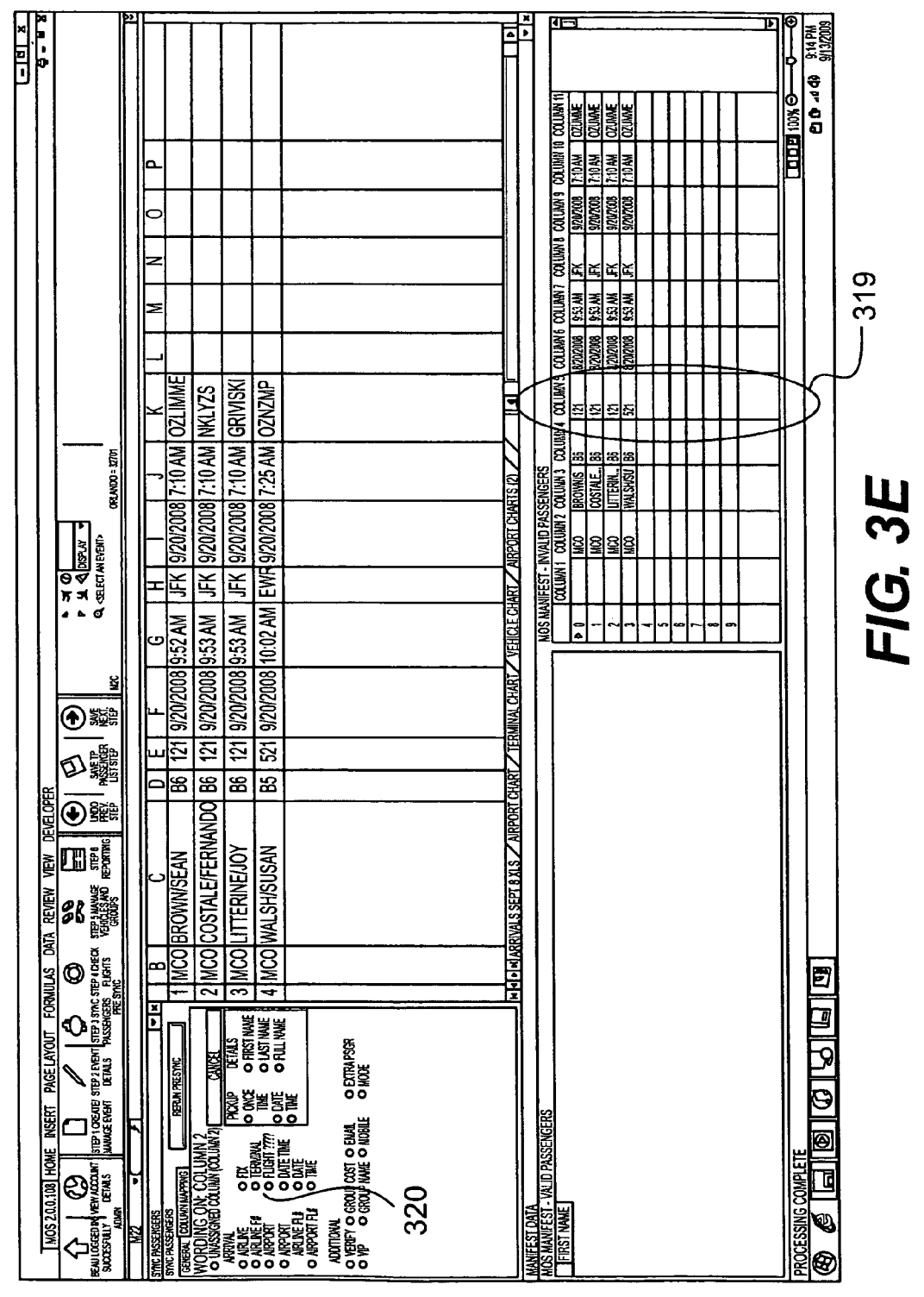

FIGS. 3C-3E are screen shots showing how to map the data columns in the manifest of FIG. 3B into the event management system 100. FIG. 3C shows the mapping of the passenger names. One of the synchronization requirements is to have a First Name and a Last Name. The event management system 100 will accept the data in various formats such as First, Last Name or Last, First Name in the same column and separated by various characters as a slash, a back slash, a space, a comma, etc. In the screen shot shown in FIG. 3C, names in the manifest appear in a single column 315 as the full name in the format of Last name/First Name. By selecting the appropriate column on the right hand side of the screen and selecting the appropriate radio button (i.e., the "Full Name" button 316) in the upper left quadrant, the system will map the appropriate column.

FIG. 3D shows the mapping of arrival airport. By selecting the appropriate manifest column 317 indicating the arrival airport (i.e., column 2) and mapping the column to the airport button 318 in the Arrival section of the user interface on the upper left quadrant of the screen, the system will accept the information in column 2 of the manifest as the arrival airport.

FIG. 3E shows the mapping of flight number. By selecting the appropriate manifest column 319 indicating the flight number (i.e., column 5) and mapping the column to Ft# button 320 in the Arrival section of the user interface on the upper left quadrant of the screen, the system will accept the information in column 5 of the manifest as the arrival flight number.

Figure 3F:
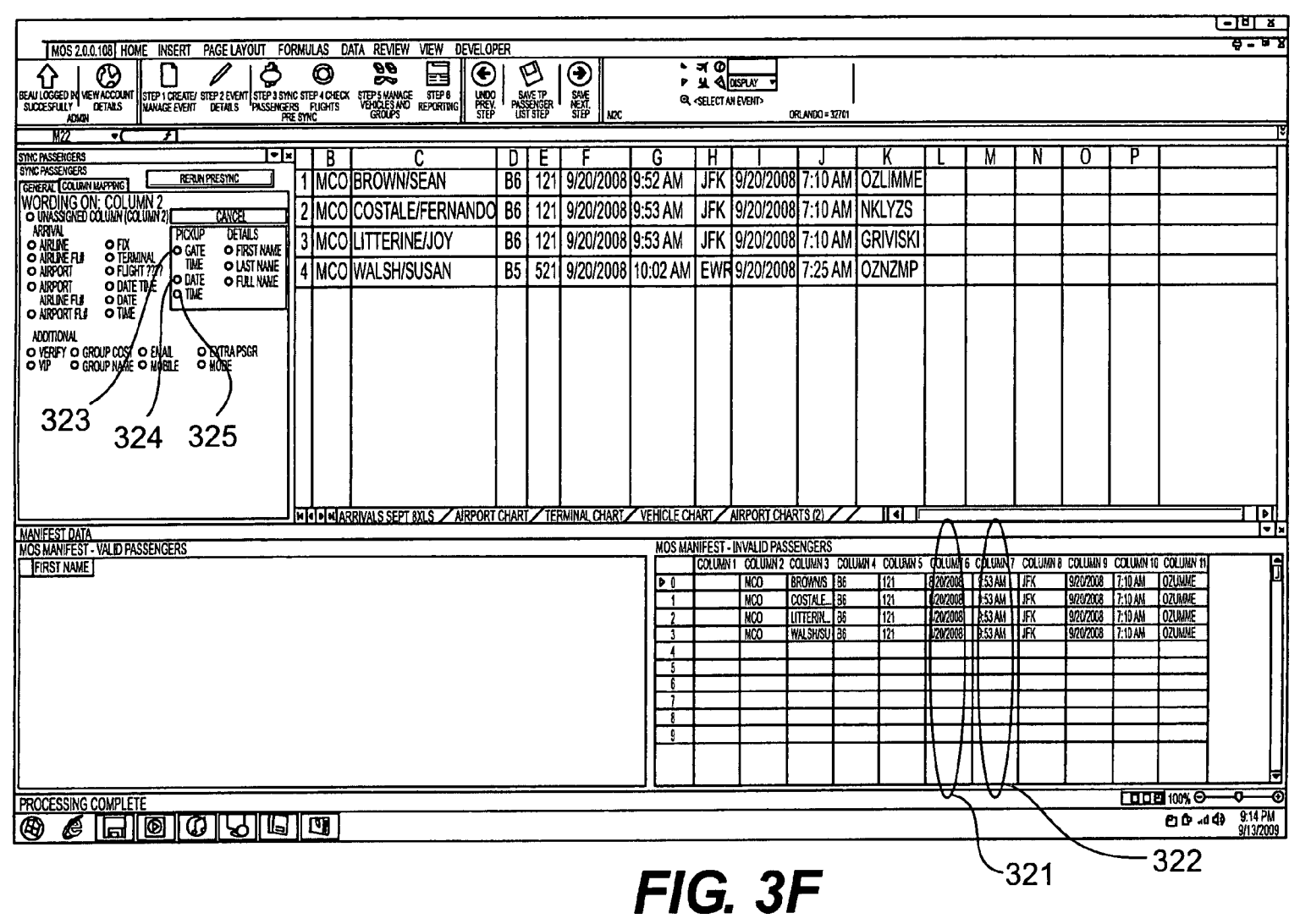

The manifest synchronization program 211 also allows two or more columns to be mapped together. As shown in FIG. 3F, the arrival date column 321 (i.e., column 6) and arrival time column 322 (i.e., column 7) of the manifest may be jointly mapped to the Date/Time button 323 in the Arrival section of the user interface on the upper left quadrant of the screen. Alternatively, the arrival date column and arrival time column of the manifest may be separately mapped to the Date button 324 and the Time button 325, respectively, in the Arrival section of the user interface.

Figure 3G:
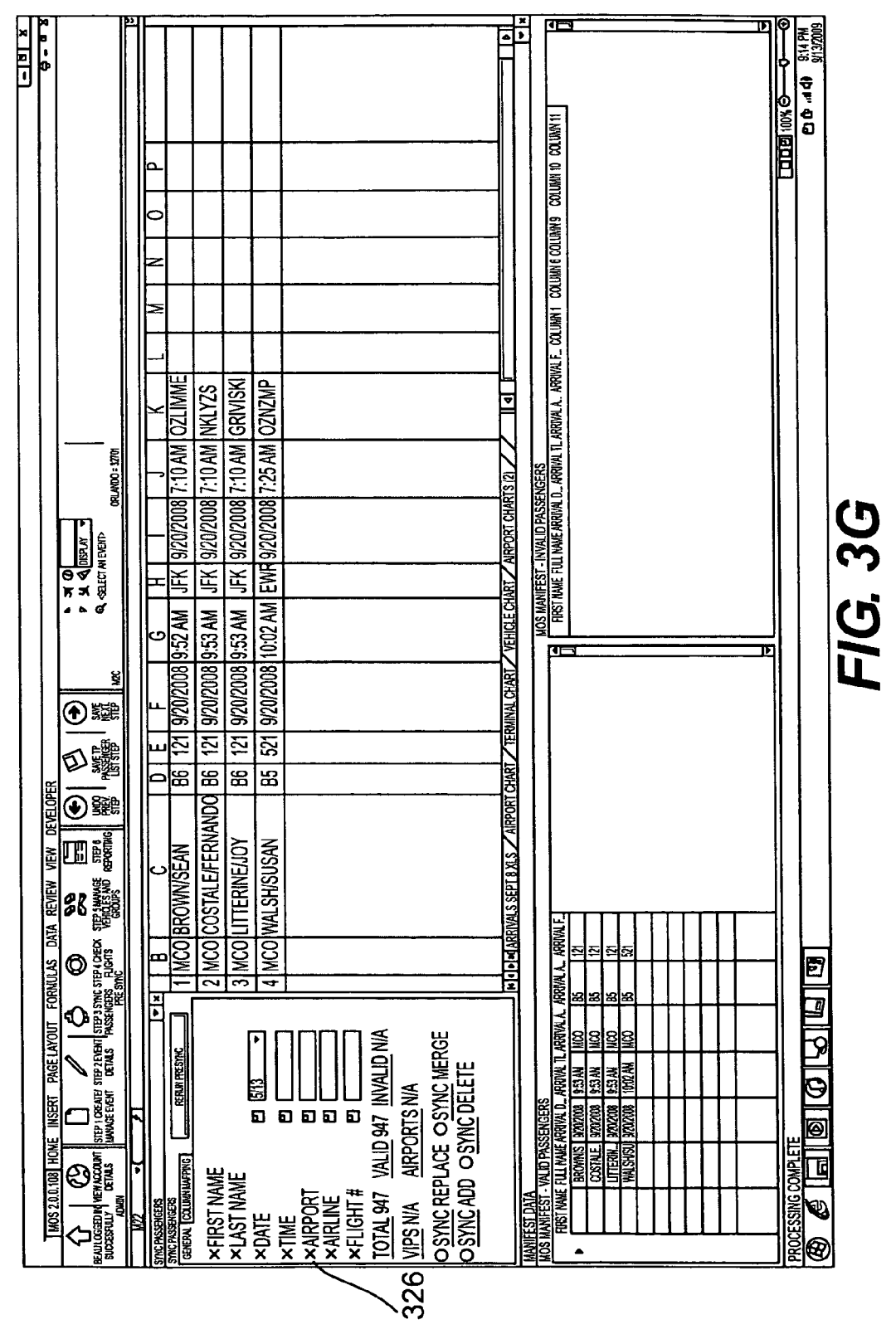

All other required criteria in a manifest may be mapped similarly. As shown in FIG. 3G, once each criteria has been met, a check mark 326 will appear in each criteria indicating that the user may go to the next step and sync the passengers.

Figure 3H:
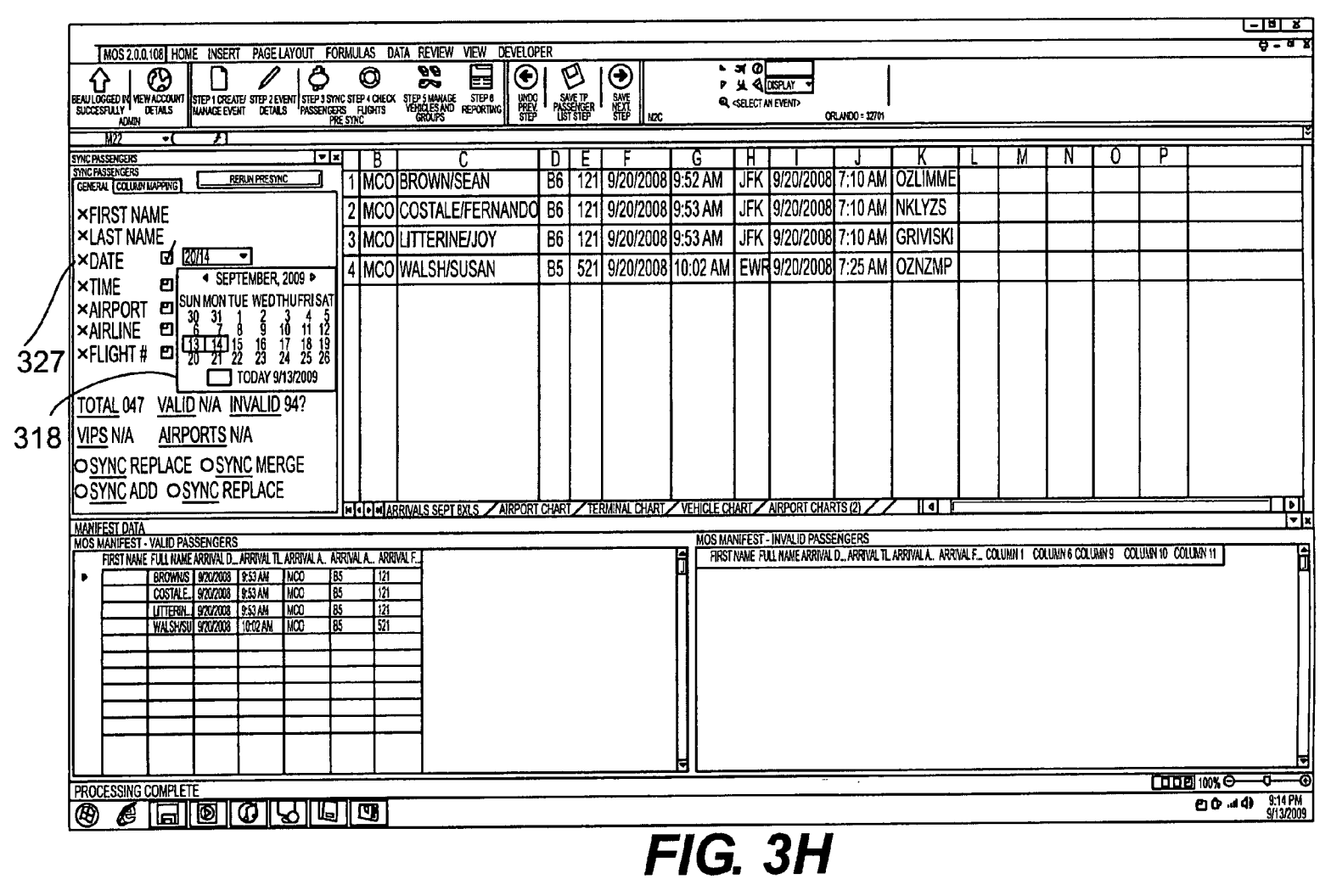

The manifest synchronization program 211 may allow an override for each criteria except for the first and last names, as they need to be different to separate passengers. By selecting the check mark to the right of the required information the system will provide you with the ability to set a default override for the entire manifest. In the example shown in FIG. 3H, a user may click on the check mark of "Date" 327 and pull up a calendar 328 to change the date of arrival for everyone in the manifest and update the manifest with the new information.

In certain embodiments, the manifest synchronization program 211 further contains an auto guessing component that is capable of fill missing data in passenger information, a faulty data detection and correction component that detects and corrects faulty data in passenger information, and/or a gender identification component that identifies passenger gender based on passenger name. In one embodiment, the faulty data detection and correction component further comprises a linguistic component to identify and offer options to correct errors in the data.

In other embodiments, the manifest synchronization program 211 is also capable of converting airline names to airline codes and/or mapping a passenger type, wherein one of the passengers types is VIP.

In addition to the manual mapping process described above, various other options are available to map the data that is required, as well as data that is not required but critical to a particular manifest. In some embodiments no manual steps or processes are performed during the synchronizing process. Once the manifest has been successfully synchronized with the event management system 100, the passenger data will be stored in an event management system database and will be automatically updated by the flight check program 212.

The Flight Check Program

The flight check program 212 has the ability to cross reference each flight number from each respective airline and airport to ensure accuracy of the data. In certain embodiments, the flight check program 212 makes a call to one or more computer systems over the interne to obtain flight information including flight schedule arrival time, flight status, any changes in flight arrival time, and arrival airport terminal. In one embodiment, the flight check program 212 has the ability to cross reference each flight number from each respective airline and airport with FlightView®.

In certain embodiments, the flight check program 212 has the ability to confirm that a flight number is in agreement with the corresponding airline listed in the passenger information and/or to confirm that a flight number is in agreement with the corresponding arrival or departure time listed in the passenger information. If a mismatch is detected the flight information for a passenger, the flight check program 212 will examine the rest of the flight information to determine which data is in error and correct the error if possible. For example, if the listed arrival airline does not have the listed arrival flight number for passenger A, the flight check program 212 will check the arrival time and arrival airport to determine which data (arrival airline or arrival flight number) is in error. If all other flight information (e.g., arrival time and arrival airport) is in agreement with the listed flight number, the flight check program 212 will assume that the listed airline is in error and replace the listed airline with the correct airline. If the flight check program 212 cannot decide which data is correct, it will highlight the data in question and request a user to correct the error.

In another embodiment, the flight check program 212 has the ability to determine airport terminal information based on flight number and airline. The airport terminal information may be initially determined based on historic information (e.g., Continental flight number CO482 usually arrives at terminal B of Washington Dulles Airport) and then update if new information becomes available.

The flight check program 212 allows notification to be set for anything that does not match up entirely to time threshold. A user can set these thresholds to only indicate the flights that do not match up within that set time frame. The flight check program 212 has the ability to have an end user correct individual flights as well as the option to save one flight and have the system auto correct everyone else on that flight. When the end user has missing information or does not know the flight, the flight check program 212 provides the ability to search for flights and display options to allow the end user to get the information without leaving the event management system 100.

In one embodiment, the flight check program 212 uses an algorithm that separates the data based on an initial scan for all flights arriving or departing on the same date, then the same airport, then the same airline, then the same flight number. Once each individual flight is checked, the flight check program 212 generates a report and displays all passengers on each respective flight for each day. In certain embodiments, the flight check program 212 operates automatically to check flight status and update the flight information periodically. In other embodiments, the flight check program 212 operates based on user request. The flight check program 212 may also highlights to users passenger flights that have been changed by the flight check program 212 based on updated flight information, and stores the date and time of the last flight check for a particular passenger manifest. In one embodiment, the flight check program 212 further comprises an airport terminal assignment component that assigns passengers to airport terminals and verifies airport terminal data.

The Event Management Program

The event management program 213 provides for user log in and allows the user to access, delete, and modify existing events, create new events, or create sample scenario events. The Event Management Program 213 is the enclosing interface of all the group applications from which all of the other components are accessed. The event management program 213 is designed to be able to manage the event from the planning stage to the actual first day of arrivals, and to the last day of departures. The event management program 213 is able to update the information from the field, remotely, or locally to track, update and monitor the status for each passenger and each job. Upon the completion of the event, the event management program 213 will generate an invoice and complete the process. In one embodiment, the event management program 213 contains a component for creating new events and a component for managing stored events.

With the never-ending changes, additions and cancellations that occur in real time during a group movement the system will allow for the user to constantly re-run the flight checks and groupings to anticipate the changes and reconfigure the new data to an optimized output. With the ability to manage form the field or remotely it is very common that when someone has made a change or a cancellation it is overlooked and a vehicle is still reserved, with real time updates it minimizes the errors and streamlines the communication to trigger an event log for every change identifying who made the change and access to view the history to identify why it was done. Having this ability contains the cost for reserving unnecessary vehicles or over/under capacity of resources as well as accounting for each passenger and each vehicle.

The Group Scheduling Program

The group scheduling program 214 allows a user to configure vehicles and vehicle types, and execute a schedule solving routine to generate groups which can then be displayed. The program allows the user to create, modify and delete groups. A group represents a single vehicle that carries a specified number of passengers. The user can optionally use the system's "Solver" which create the groupings for all of the passengers automatically based upon their flight arrival times, passenger preferences, vehicle preferences, and vehicle capacities. The Solver's groupings can either be 100% automatic or can be used to assist the user in creating their own groupings.

Figure 4A:
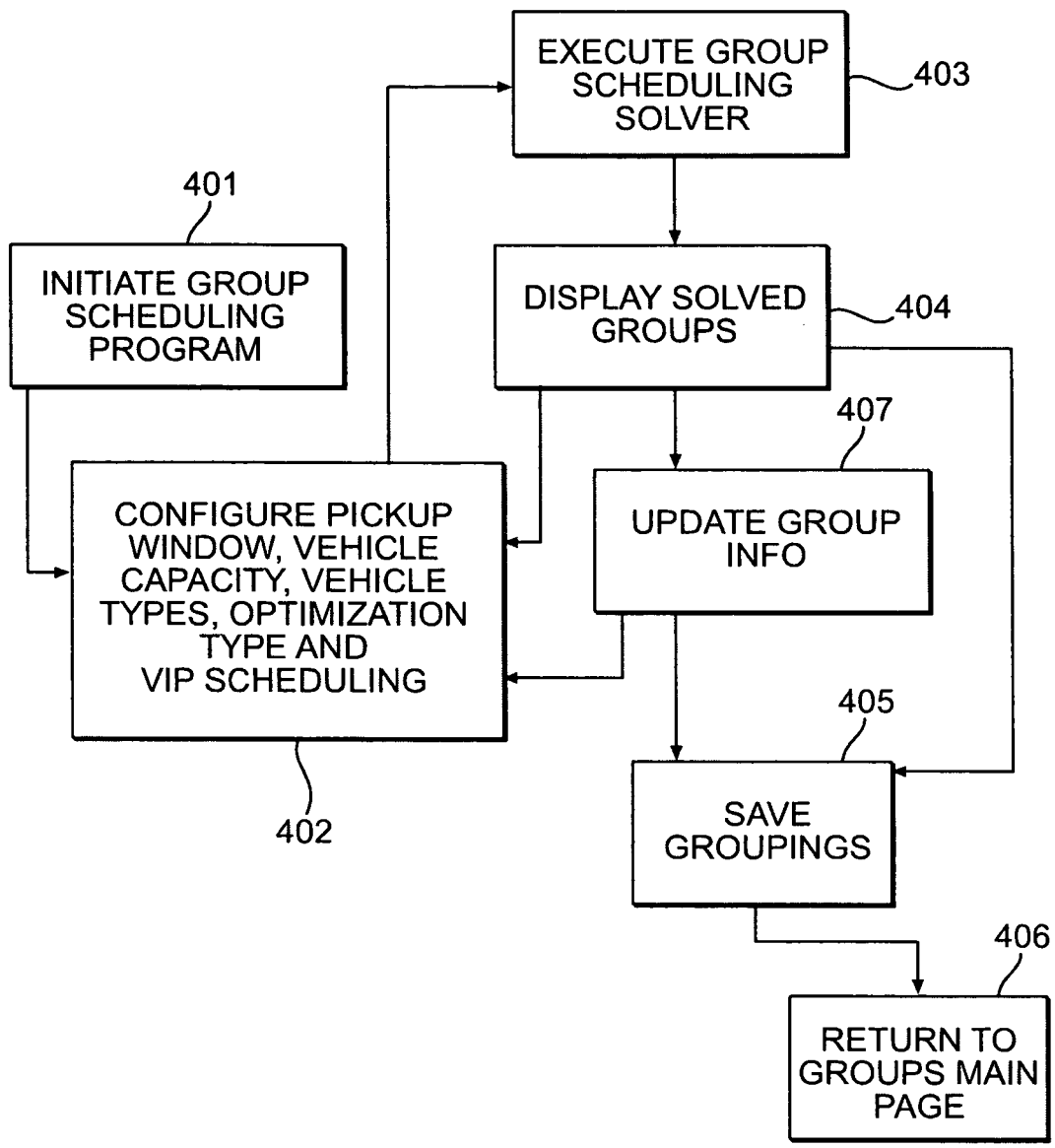
FIG. 4A is a flowchart for the group scheduling program.

FIG. 4A is a flow-chart of the group scheduling program 214 that provides an overview of the various routines in the group scheduling program 213. In particular, FIG. 4A shows that various subroutines may be used to achieve the desired grouping solution prior to display. After the initiation of the group scheduling program 213 (subroutine 401), the group scheduling program 213 allows the selection of a pick-up window of time, vehicle capacity, vehicle types and VIP Program (subroutine 402). After these various parameters are set, the program then executes a group scheduling solver routine which provides solutions to the user based on the entered parameters (subroutine 403). The result of this is a grouping of passengers for pick up by certain vehicle types at airport terminals. The group scheduling program 213 provides optimization for types of vehicles and allows for VIP scheduling. This program provides the routine then displays the solution (subroutine 404). The user may either save the groupings (subroutine 405) and return to the main page of the program (subroutine 406), or return to the configuring subroutine 402 to change variables and re-execute the group schedule solver routine until a suitable solution is reached. Also, the routine allows for the user to update the groups, make changes to the groups, and create different groups (subroutine 407). The updated groupings may be saved (subroutine 405) or reconfigured (subroutine 402) until satisfactory groupings are achieved.

Figure 4B:
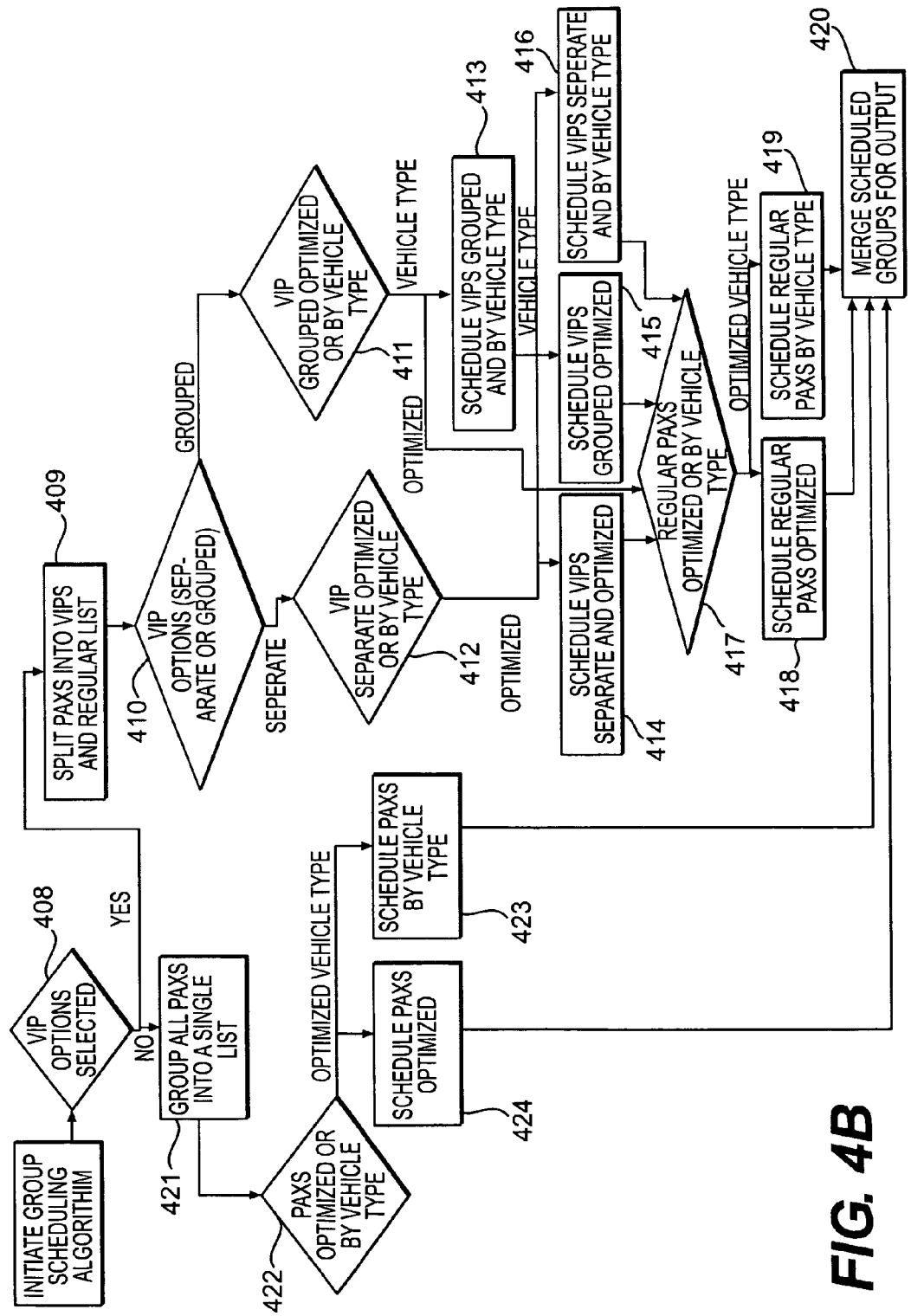
FIG. 4B is a flowchart showing alternative options available for the group scheduling program.

FIG. 4B shows a flow-chart of the group scheduling program 214 in greater detail than FIG. 4A. In the particular embodiment shown in FIG. 4B, the first decision is whether a VIP option is selected or not (408). If the VIP option has been selected then the passengers are divided up into VIP type passengers and regular or non-VIP passengers (409). If there are VIP type passengers then the program allows the user to select (410) whether the VIP passengers can be grouped together into single vehicles (411) or whether each VIP will be afforded his own individual vehicle (412). It is also possible for the user to group certain VIP passengers while leaving other VIP passengers selected to ride in individual vehicles. So therefore, even amongst VIP passengers a user can distinguish between VIP passengers entitled to separate vehicles and those that may be grouped with other VIPs and share a vehicle. In one embodiment, the group scheduling program 214 will now group and schedule the VIPs in either separate or grouped vehicles and optimized by vehicle type (413-416).

In another embodiment, the VIP passengers are handled separately and generally prior to the non-VIP passengers in order to allow for the most customization and best vehicles and timing of vehicles to be provided to the VIPs. In this way the VIP waiting time should be minimized even if the fleet's size is not sufficient to accommodate the shortest waiting times for all attendees.

Regular passengers are then handled by the group scheduling program 214. Passengers may be scheduled in an efficient and optimal way or may be placed into designed vehicle type or combination of both. This is initially determined by decision tree (417). Afterwards passengers and their groupings are optimized by vehicle type (418) and schedule (419). If the VIP option is not selected, the group scheduling program 214 will group all passengers in a single list (421). The groupings are arranged and optimized (422) by vehicle type (423) and schedule (424).

The group scheduling program 214 will recursively attempt to group the passengers within the parameters set of waiting time, vehicle types available, price, etc., until the group scheduling program 214 achieves what is considered a best or optimal solution to the grouping problem. Once the VIPs and the non VIPs are grouped and scheduled, the information is compiled and prepared for display (subroutine 420).

In certain embodiments, the group scheduling program 214 uses an algorithm that separates the passenger data based on an initial scan for all flights arriving or departing on the same date, then the same airport, then the same terminal. An initial passenger arrangement will be created as a pre-group function. With this pre-group, the algorithm will now look to group these passengers with the time threshold window indicated and then the smallest vehicle that can accommodate the exact number of passengers in the group. Once this grouping function is run, the algorithm will do a sweep and repeat the process. The purpose of repeating this routine is to ensure that all passengers have been assigned to a vehicle. For example, if the system groups 30 people that would be grouped in a vehicle and the parameters set by the user state that the largest vehicle is a vehicle with a capacity of 25 people, the first 25 people based on alphabetical order will be assigned to this vehicle. The 5 passengers that were not assigned will then be assigned to a vehicle that had remaining capacity. If nothing is available, the 5 passengers will then be assigned to the smallest vehicle that is capable of handling the group.

In one embodiment, the group scheduling program 214 uses an algorithm that contains the steps of (a) allowing for the setting of parameters including time windows, available vehicle types, and number of passengers allocated for vehicle type; (b) assigning passengers arriving or departing in a specified time window to a time group; (c) assigning passengers within the time group to one or more terminal groups based upon expected arrival or departure airport terminal for each passenger; (d) counting a number of terminal groups; (e) setting a terminal group counter to one; (f) incrementing and storing the terminal group counter in a memory; (g) if the terminal group counter exceeds the number of terminal groups go to step (j); (h) defining one of the one or more terminal groups whose passengers are unassigned to a vehicle type as a temporary group; (i) determining, using a computer, if any one of the available vehicle types will accommodate all passengers in the temporary group, if so, (u) choosing an available vehicle type that will accommodate all passengers in the temporary group and has least number of passengers allocated for vehicle type, (v) assigning the passengers in the temporary group to the chosen vehicle type, and (w) returning to step (f), if not, (x) assigning as many passengers from the temporary group to the available vehicle type that accommodates highest number of passengers based upon the number of passengers allocated for vehicle type, (y) redefine the temporary group as those passengers that remain unassigned to a vehicle type, (z) repeat step (i); (j) repeat steps (b) through (i) for time windows with passengers; and (k) displaying passenger assignment on a computer display.

The step (x) may further comprises the sub-steps of creating a flight group by assigning passengers, in the temporary group, on the same flight to a flight group and assigning as many passengers in the flight group as possible to a the available vehicle type. The algorithm may further allow a user to define the VIP status of each passenger at a user interface for setting parameters and assigns vehicles first to VIP passengers.

In another embodiment, the group scheduling program 214 uses an algorithm that contains the steps of (a) allowing for the setting of parameters including time windows, available vehicle types, and number of passengers allocated for vehicle type; (b) assigning passengers to flight groups wherein all passengers on a certain flight are in a flight group; (c) repeating steps below using a computer until all passengers are assigned; (d) defining a temporary group as a flight group; (e) for the temporary group, determining if number of passengers in the temporary group exceeds highest number of passengers allocated for any vehicle type, if so go to step (h); (f) for the temporary group, determining if there are any flight groups using a terminal that is a same terminal as the temporary group and having a flight that is within the time window, if there are no such flight groups go to step (h); (g) redefining the temporary group by combining the temporary group with a flight group that is at the same terminal and has closest flight time or closest median flight time to the temporary group, and go to step (e); (h) determining, using a computer, if any one of the available vehicle types will accommodate all passengers in the temporary group, if so, (u) choosing an available vehicle type that will accommodate all passengers in the temporary group and has lowest of the number of passengers allocated for vehicle type, (v) assigning the passengers in the temporary group to the chosen vehicle type, and (w) returning to step (c), if not, (x) assigning as many passengers from the temporary group to the available vehicle type that accommodates highest number of passengers based upon the number of passengers allocated for vehicle type, (y) redefine the temporary group as those passengers that remain unassigned to a vehicle type, (z) repeat step (e); and (k) displaying results of passenger assignments on a computer display. The algorithm may further allow a user to define the VIP status of each passenger at a user interface for setting parameters and assigns vehicles first to VIP passengers.

Figure 4C:
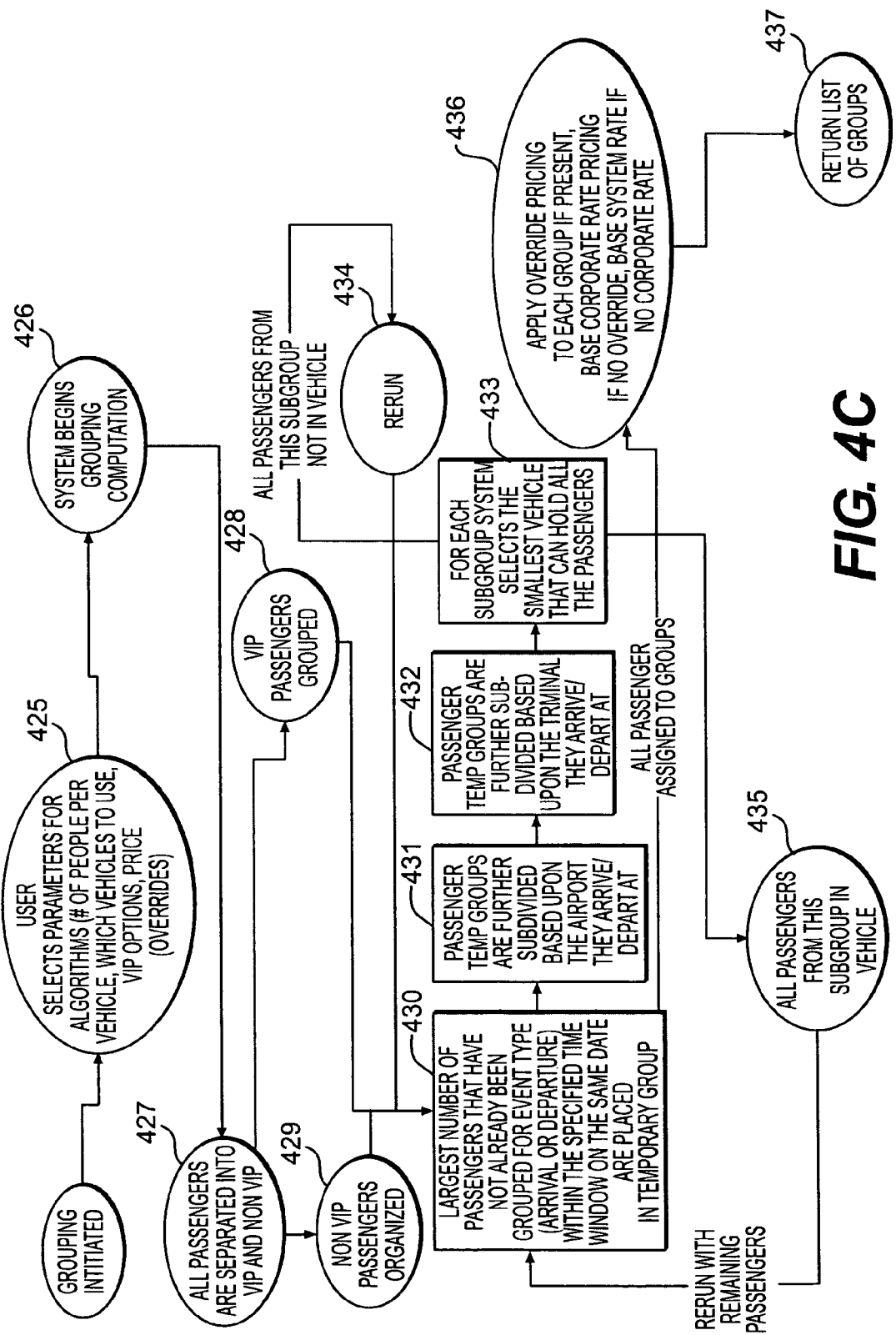
FIG. 4C is another flowchart showing alternative options available for the group scheduling program.

FIG. 4C shows another embodiment of a grouping process. At the outset, the user selects parameters for grouping algorithms (425). The program begins grouping using the selected parameters (426). All the passengers are separated into VIP and non-VIP categories (427). The VIP passengers are grouped first (428). Briefly, the largest number of passengers that have not already been grouped for an event type (e.g., arrival or departure) with a specified time window on the same date are placed in temporary groups (430). The temporary groups are subdivided based upon the arrival or departure airport (431). The subdivided temporary groups are further divided based on the arrival or departure terminal (432). For each subgroup, the program then selects the smallest vehicle that can hold all passengers in the group (subroutine 433). The program then returns to subroutine 430 to deal with the next largest number of passengers that have not already been grouped for an event type with a specified time window on the same date until all VIP passengers are grouped (435). The non-VIP passengers are grouped (429) after the VIP passengers in the same manner. If the number of passengers in the subgroup exceeds the passenger capacity of the largest vehicle that is available, the group scheduling program 214 will assign the maximum allowed number of passengers to the available vehicle (e.g., based on alphabetical order of the last name of the passenger) and send the remaining un-assigned passengers back to subroutine 430 for regrouping (434). The system will prioritize which passengers to assign to the available vehicle. The system may be programmed to prioritize the passengers in a number of ways including by flight, by arrival time, by alphabetical order based on last name, by employee types or random prioritizing.

After all passengers are assigned to groups, the program calculates a price for the grouping (436) and displays the grouping and price (437). The pricing is calculated based a base rate or a corporate rate, if any. The user has the option to override pricing for each group.

Figure 4D:
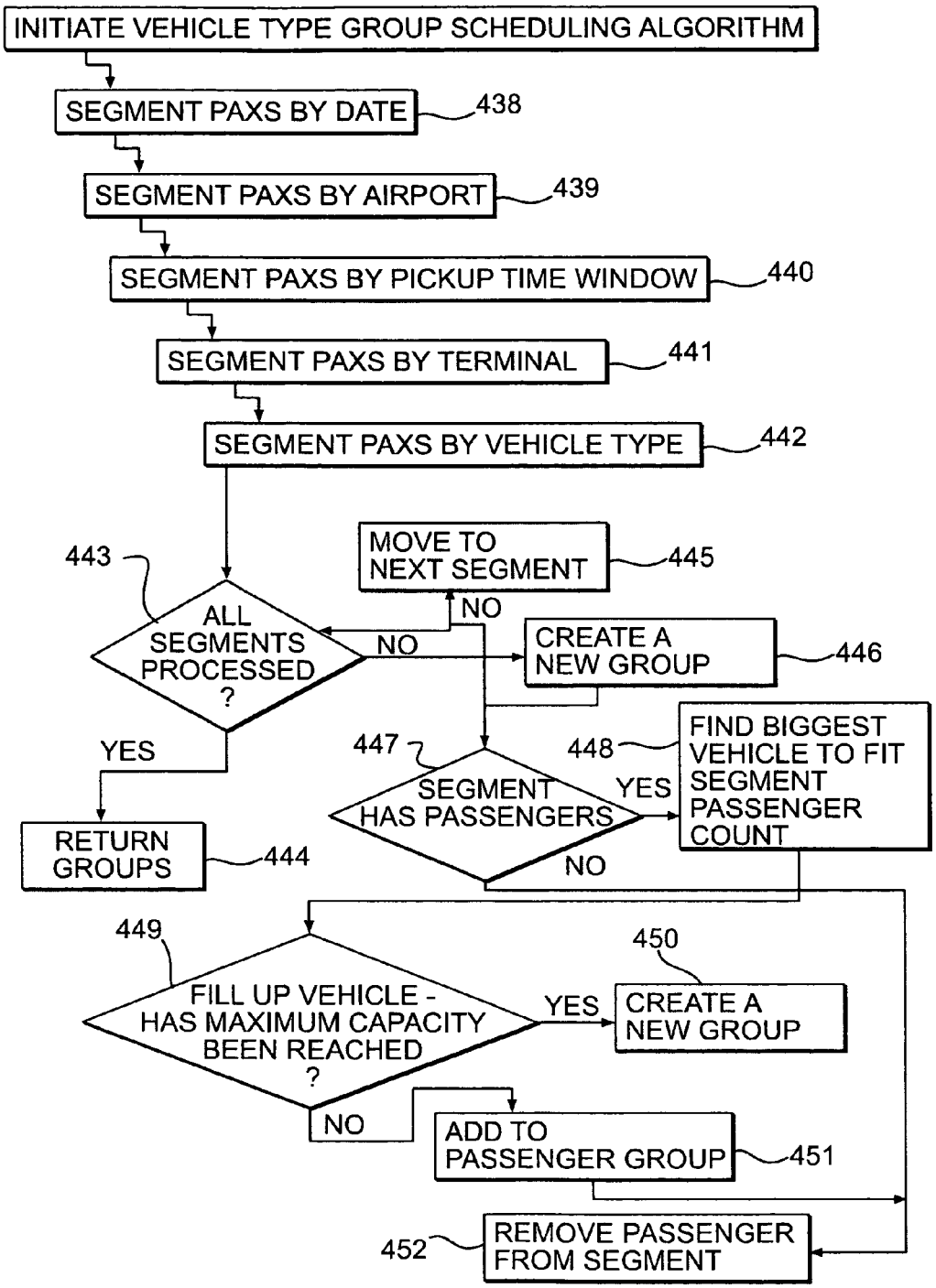
FIG. 4D is a flowchart for an embodiment of the vehicle type group scheduling algorithm.

FIG. 4D shows the vehicle type selection component of the group scheduling program 214 in greater detail than FIG. 4B. In the particular embodiment shown in FIG. 4D, the first decision is to segment the passengers by date of arrival as shown in "Segment Passengers By Date" 438. Once the passengers are segmented by date, then each date segment is re-segmented by airport as shown in "Segment Passengers By Airport" 439. Once the passengers are segmented by airport, then each airport segment is re-segmented by pickup time window unit intervals as shown in "Segment Passengers By Pickup Time Window" subroutine 440. Once the passengers are segmented by pickup time window unit intervals, then each date segment is re-segmented by terminal as shown in "Segment Passengers By Terminal" subroutine 441. Once the passengers are segmented by terminal, then each terminal segment is re-segmented by vehicle type as shown in "Segment Passengers By Vehicle Type" subroutine 442. Once the passengers are segmented by vehicle type, a decision point is reached as shown in "All Segments Processed" subroutine 443. If all passengers have been successfully processed, meaning every passenger has been assigned to a group, then the list of groups are saved and the user is returned to the main program as shown in "Return Groups" subroutine 444. If not, a new group is created as shown in "Create a New Group" subroutine 446. If the segment has no passengers, the system proceeds to the next segment as shown in "Move To Next Segment" subroutine 445. If the segment does have passengers as shown in "Segment Has Passengers" subroutine 447, then the program selects the largest vehicle to fit the number of passenger's in that segment is shown in "Biggest Vehicle Fit" subroutine 448. Once the system selects a vehicle type, then a decision point is reached as shown in "Fill Up Vehicle" subroutine 449. If the maximum vehicle capacity for the given vehicle type has been reached, then a new group is created as shown in "Create a New Group" subroutine 450 and a passenger is added to that group as shown in "Add Passenger To Group" subroutine 451. If the maximum vehicle capacity has not been reached, then a passenger is added to the group as shown in Add Passenger To Group subroutine 451. After a passenger is added to the group as shown in Add Passenger To Group subroutine 451 that passenger is removed from the segment as shown in "Remove Passenger From Segment" subroutine 452. In the Remove Passenger From Segment subroutine, the program checks if additional passengers exist in the segment as shown in "Segment Has Passengers" subroutine 447. Once all passengers are allocated to groups, control is returned to the main "Groups Program" as shown in "Return Groups" 444.

Many methods of grouping passengers into cars are available. The goal is typically to group all passengers on same flight along with passengers arriving on flights at the same terminal within a time segment.

Figure 4E:
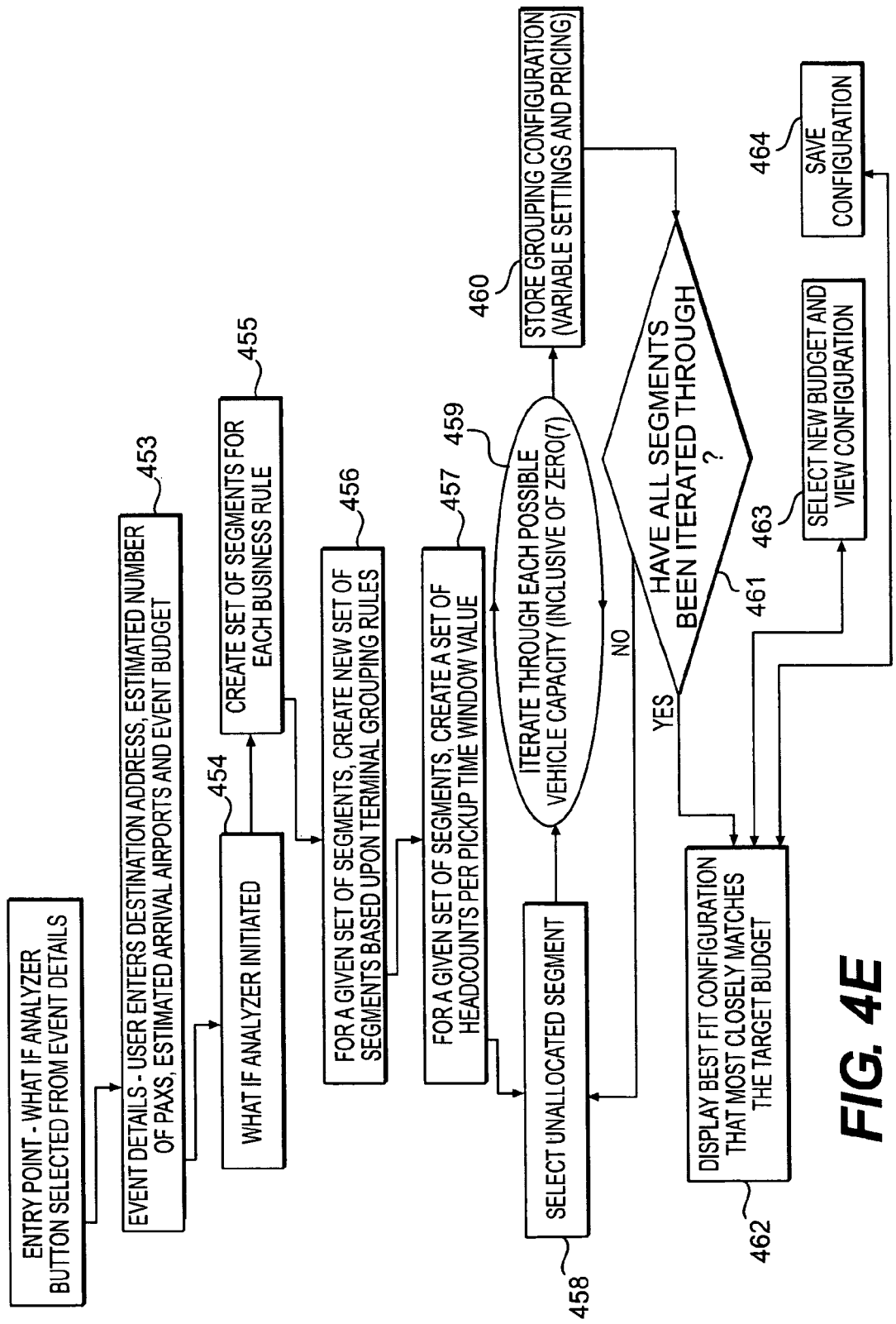
FIG. 4E is a flowchart showing another embodiment of the vehicle type group scheduling algorithm.

FIG. 4E shows an embodiment of a "What If Analyzer" component of the group scheduling program 214. In the particular embodiment shown in FIG. 4E, the user specifies the destination address of the event, estimated number of passengers, estimated arrival airports, and a budget for the event as shown in "Event Details" subroutine 453. Upon entry of event details, the What If Analyzer subroutine as shown in 454 is initiated and the system executes the "Create Set Of Segments For Each Business Rule" subroutine 455. Once passengers are allocated into segments based upon business rules, passengers are re-segmented based upon terminals as shown in "Terminal Grouping Rules" subroutine 456. Once passengers are segmented by terminals, passengers are re-segmented by pickup time window as shown in "Pickup Time Window Grouping Rules" subroutine 457. Then the system selects an unallocated segment as shown in "Select Unallocated Segment" subroutine 458. A loop is reached where the system continually iterates through every possible vehicle capacity, inclusive of zero capacity, as shown in "Vehicle Capacity Iteration subroutine" 459. A vehicle capacity of zero is equivalent to excluding a vehicle from the iteration, so once the iterations are complete the system will have scanned all possible vehicle capacities as well as all possible vehicle combinations, as shown in Vehicle Capacity Iteration subroutine 459. Then the grouping configuration, including all pricing, vehicle capacities, and other variables associated with the grouping are saved as shown in "Store Grouping Configuration" subroutine 460. A decision point is reached where the system checks if all configurations have been iterated through as shown in "Segments Complete" subroutine 461. If there are additional segments, the system picks another unallocated segment as shown in "Select Unallocated Segment" subroutine 458. If there are no additional segments, the system shows the grouping configuration that most closely matches the budget as shown in "Displays Best Fit Configuration" subroutine 462. The user then can select a new budget as shown in "Select New Budget" subroutine 463 and then the user is shown that new configuration as shown in "Displays Best Fit Configuration" subroutine 462. The user can also save the configuration as shown in "Save Configuration" subroutine 464.

Another embodiment of the what if analyzer focuses on flights and attempting to group passengers on the same flight together for greeting, ground transportation, hotel accommodations or other services. This can be used for departures as well as arrival of attendees. The priority or preference in this embodiment would be not to break-up into separate groups passengers arriving on the same flight unless it provides a significant financial advantage. The process would look to keep everyone on the same flight together in a flight group and add a group of passengers to the first flight group whom arrived together on a second flight in order to increase the size of the first flight group. In certain embodiments, in certain situations splitting of passenger is allowed to accommodate better pricing of services. The flight preference version of the what if analyzer begins by grouping all passengers who are on the same flight into separate individual groups, flight groups. In this manner each flight represents a separate group, flight group. The analyzer then process the cost of service (e.g. moving each flight group in the most efficient vehicle configuration) and saves that cost number in memory. Next, the embodiment looks for opportunities to expand each group beyond a single flight group by combining two flight groups. The system takes each flight group and looks for another flight group in the same terminal to combine with the first group, e.g. passengers on other flights that arrive at the same terminal. After identifying such flight groups the system considers combining the two groups thereby creating a larger two flight group. For each combination of flight groups the system calculates the cost of the service (e.g. movement or ground transportation) and stores the cost number. The system then iteratively attempts various combinations of two flight groups, where feasible, and calculates service costs until it has exhausted all reasonable possible combinations. The system will consider extended wait times as unreasonable (greater than a set time limit e.g. 1.5 hours). It then attempts combinations of three flight groups and stores the cost number, followed by four flight groups and so on. When it is complete it will present the user with some or all of the options calculated and the cost of service for each combination. The user is now free to select an option for passenger grouping knowing its budgeted cost for the requested service.

In another embodiment, the what if analyzer provides an "Options" function that suggestively offers to a user different options for service. In particular, it highlights to user different parameter settings or ranges that will dramatically impact the results based on price, number of vehicles, wait time, etc. When a user groups the manifest and gets a grouping and budget result, the what if analyzer will thereafter analyze the information and provide feedback to illustrate various alternative options that a user may want to consider. Once the grouping function has delivered results based on the parameter settings indicated by the user, alternative options will be displayed to provide various cost effective options that may be preferable by the user. The what if analyzer will take the initial output and based on the initial algorithms, cross reference the information and identify what changes would alter the results to yield a more cost effective solution or better solution.

In one embodiment, a first option will run an algorithm that will look to find out at what point changing the time window threshold to a greater amount will deliver a more cost effective solution that will solve for a 10% reduction in cost. A second option will run an algorithm that will look to find out at what point changing the vehicle capacities to a greater amount will deliver a more cost effective solution that will solve for a 10% reduction in cost. A third option will run an algorithm that will look to find out at what point changing each setting a minimal amount to deliver a more cost effective solution that will solve for a 10% reduction in cost. These options may then be displayed to the user. If any of these options would be preferred, by simply selecting that option the groupings will be regrouped to accomplish the selected results with the new settings. The what if analyzer will also have the ability to adjust the percentage delta you will be looking to change with the new settings, for example instead of 10% the user may want to achieve a 20% savings and the what if analyzer will run the options to achieve the new desired percentage.

Figure 4F:
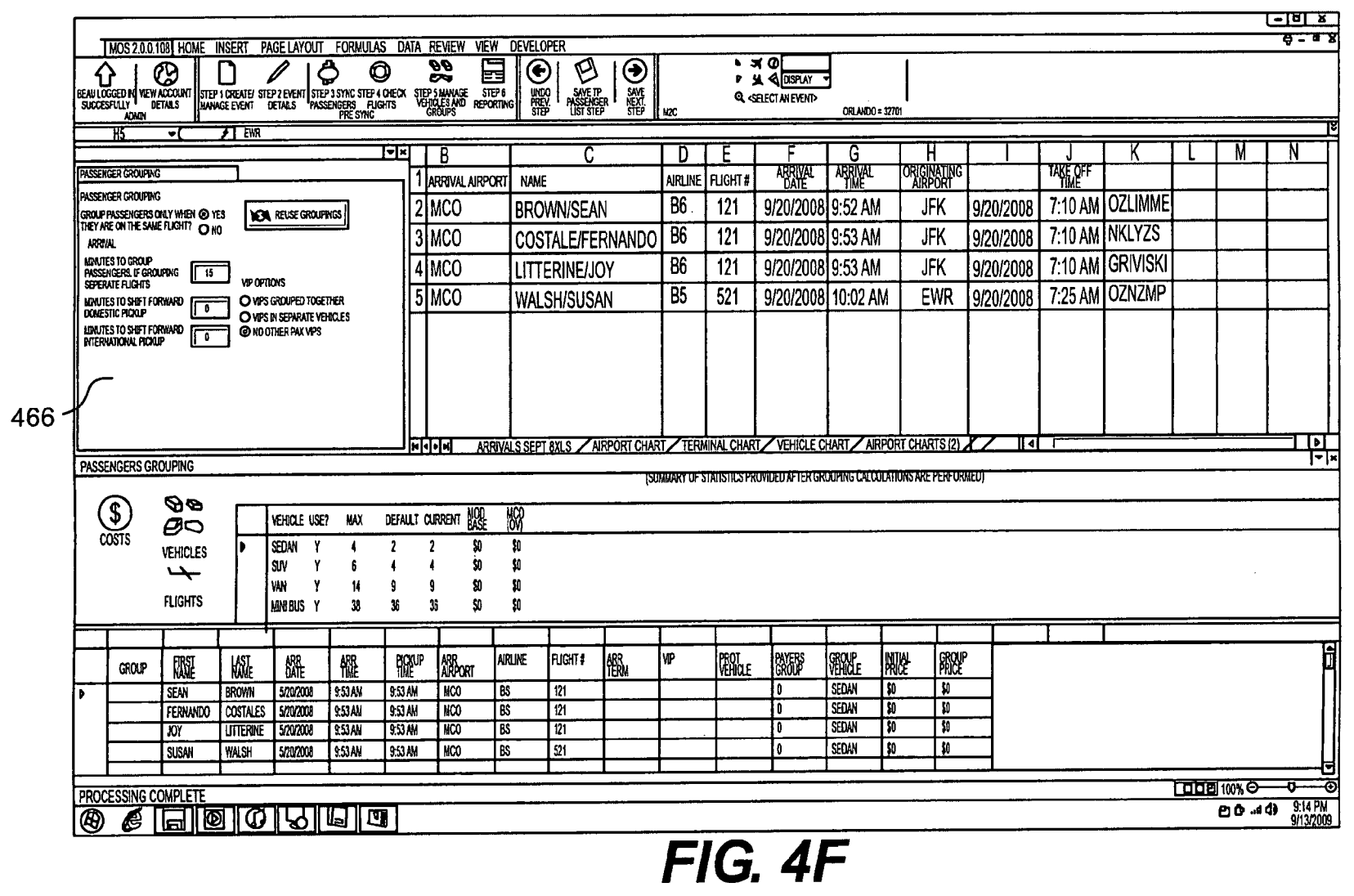
Figure 4G:
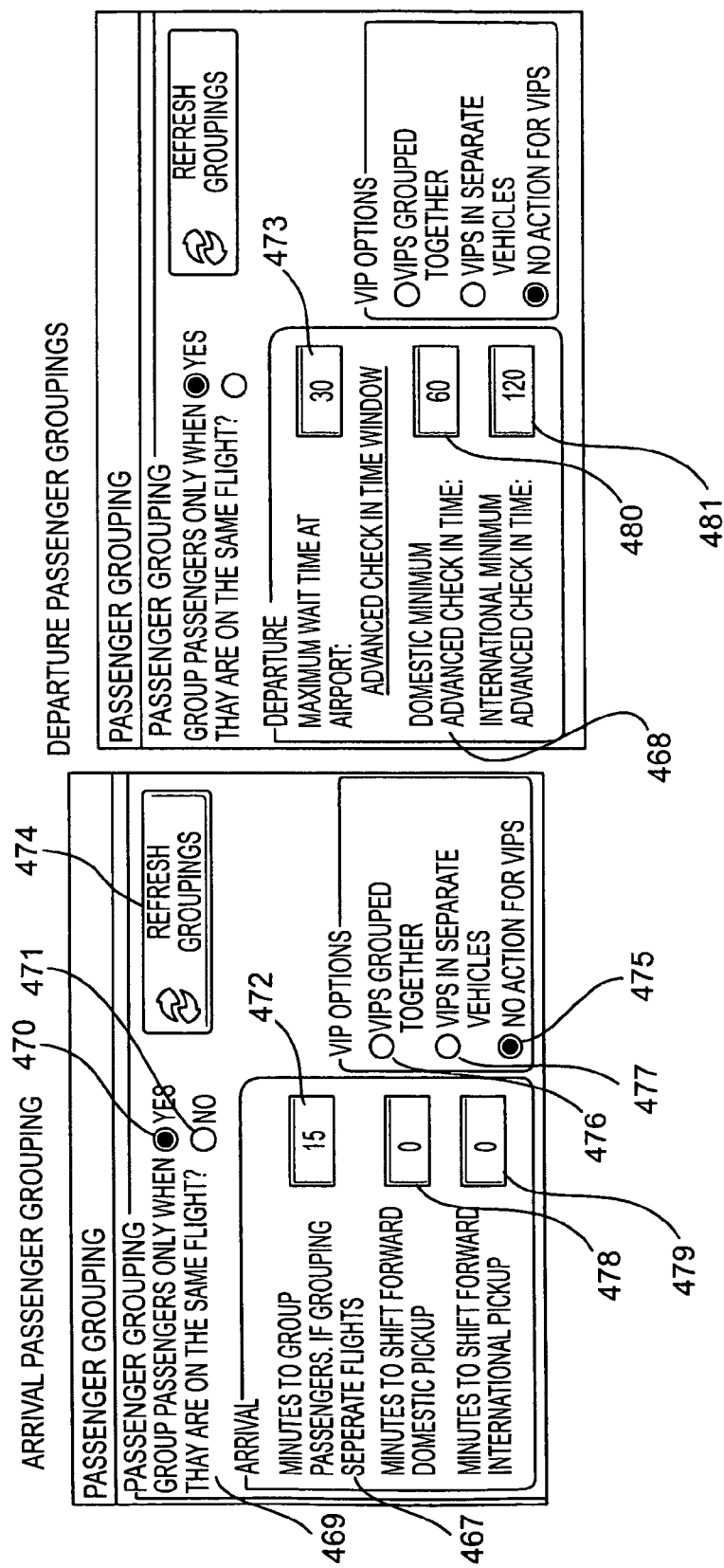
FIG. 4G shows exemplary parameter settings for arrival passenger grouping and departure passenger grouping.

FIG. 4F shows an exemplary screen shot of an user interface page of the group scheduling program 214. The Passenger Grouping settings 466 shown in the top left corner of the screen. FIG. 4G shows exemplary parameter settings for arrival passenger grouping 467 and departure passenger grouping 468. The group scheduling program 214 allows passengers to be grouped only when they are on the same flight (box 469) by selecting the "Yes" button 470 in the box 469. Another option is to have passengers booked on flights arriving within a certain number of minutes. If "No" (button 471) is selected in box 469, the number of minutes desired between flights needs to be entered in box 472 to set the grouping parameter. For a Departure the maximum wait time at the airport minutes threshold needs to be indicated in box 473 if passengers will not be grouped on the same flight.

Referring again to FIG. 4G, in order to initiate the grouping computation, the Refresh Groupings button 474 (see, FIG. 4G) is selected to generate the groupings. Groupings by VIP status may or may not impact a manifest, if the manifest does not have any VIP's within the data NO action for VIP's (button 475) may be selected. In the event the manifest has VIP's, the two options are to group the VIP's together (button 476) or in separate vehicles (button 477). When VIP's are grouped together the grouping parameters are set first and take precedence, thereafter if VIP's are within a group they are then separated out and grouped in the appropriate vehicle that will accommodate the number of VIP's. When VIP's in Separate Vehicles is selected, each VIP will be provided with an individual vehicle regardless of when their flight is arriving or departing.

Groupings by Time will depend on the event managing Arrivals or Departures. For arrivals and departures, the program has the capability as mentioned before to group passengers on the same flight only or on flights arriving within a certain number of minutes. The program also provides the ability to shift the pickup window forward for a desired number of minutes to account for any wait time by entering the desired wait time in windows 478 and 479 for domestic and international flights, respectively. For departures the program provides the ability to set an advanced check in time window for both domestic and international flights in windows 480 and 481, respectively.

FIG. 4H shows an exemplary vehicle settings for passenger grouping by vehicle. The vehicle column 482 provide the vehicle type and the max column 484 shows the maximum number of passengers allowed in each type of vehicle. Grouping by vehicle can be set in the respective field for each vehicle. If the vehicle is desired to be grouped, a "Y" is selected in the Use? column 483 in the row corresponding to the vehicle. The program provides a default passenger setting 485 for each type of vehicles. The current passenger setting 486 can be changed to have any number of passengers up to the maximum capacity shown in column 484.

If a price has been established in the system, the rate will autopopulate underneath each respective airport for the appropriate vehicle in columns 487 and 488, for example. The program has the ability to store pricing for each respective airport to any zip code. If a price is not stored or a pricing override is desired, the user may type in the rate in the Airport (OV) column 488 to apply the override Similar subroutines are provided for Grouping by Airport and Grouping by Terminal. Again, the program allows a user to set up various parameters, such as grouping passengers on the same flight, minutes to group passengers if grouping separate flights, for arrivals minutes to shift forward domestic and international pick up times, for departures maximum wait time at the airport, advanced domestic and international minimum check in time, set VIP's to be grouped together, separate or not at all, ability to select desired vehicle types, set capacity of vehicles, and set prices for vehicles.

In certain embodiments, the group scheduling program 214 may incorporate a number of additional parameters into its grouping algorithm to further improve the efficiency of passenger grouping and transportation. Examples of additional parameters include, but are not limited to, vehicle passenger load time, vehicle passenger unload time, refueling times, wait time, number of refuels, total number of trips, maximal number of loops/rotation, break time, vehitle specific travel time, vehicle luggage capacity, estimated luggage numbers (tied to passenger count), transport zoning requirement, and transport access.

The Passenger Management Program

The passenger management program 215 of this embodiment allows a user to delete, edit, and add passengers assigned to participate in an event. The passenger management program 215 contains a passenger status component for one of more of the following: changing, adding and editing a status for a passenger. Passengers may be added either manually through the "Add Passengers" feature, or automatically by importing a passenger manifest. passenger management program 215 can also allow the validation of flight information and the importing or exporting of passenger data to other systems or external software. For example, the user may instruct the program to validate and automatically correct the flight data for all of the passengers.

Prior to executing passenger management features, the event management system 100 typically has passenger data available. The passenger data may be stored locally in the client application 111 or display terminal 120, or remotely in the database server 113 or 115. This storage is done as described earlier by the manifest synchronization program 212, which uploads manifest data, maps the passenger manifest date and then transforms the passenger manifest data and stores the data in the system. In this embodiment when passenger data is edited, or if new passengers are to be added, the user is allowed to store the passenger data once the changes have been made and update the passenger list or manifest for the particular event.

In certain embodiments, the passenger management program 215 may allow the user to prompt for flight validation and can perform a validation of all the flights that are stored in the event management system 100 for the particular passengers of that event.

Finally, the passenger management program 215 allows for exporting the passenger list into a ground transport dispatch system. Various bidirectional real time synchronization between the passenger management program 215 and the back-end ground transport management platform may exist and be supported by the passenger management program 215. In other embodiments, the passenger management program 215 also allows for exporting of passenger lists to a file or to other outside systems.

The Vehicle Management Program

The vehicle management program 216 allows a user to view the vehicles involved in an event and make changes as appropriate. In particular, it allows the user to edit the vehicle information by creating custom vehicle types, defining the capacity of each vehicle and defining the inventory available for each vehicle. In one embodiment the management of the vehicles involved in an event can be edited and saved with the event in the event management database. The vehicle management program 216 allows the user to enter a rate for each vehicle as well as changing, editing or eliminating the vehicle rates. By tracking the rates the vehicle management program 216 can assist in determining the cost for the ground transportation for a particular event. Normally, various vehicle types are available for any given event, such as sedans, limos, vans, minibuses and motor coaches. Typically each of these vehicles has different rates and a different capacity to carry passengers. The same type of vehicle may also have different rates at different locations. In certain embodiments, the vehicle management program 216 maintains a vehicle database that contains all vehicle related information, including but is not limited to, vehicle rates, passenger capacity, special vehicle features such as on-board DVD player, on-board bar, etc., airport terminal maps and other information.

The Staff Management Program

Staffing is an important consideration in event management planning. Typically, staff includes greeters at the airport, greeters at hotels, greeters at event locations and drivers or chauffeurs. The staff management program 217 allows users to manage the staff assigned to particular events. In one embodiment the program also assists the user in determining how much staff is needed for an event and where and when to position staff at certain locations for the event. The staff management program 217 allows the user to add additional staff to an event, edit the current staffing of an event and save those determinations in the event management database. The system also allows the user to delete the number of staff or delete particular individuals in the staff from the event.

In one embodiment, based upon the parameters that are entered by the user, such as whether greeters are desirable at airports and hotels, and how many passengers a greeter can handle at one time, the staff management program 217 will determine the number of individual staff members that are needed to properly staff an event. By automatically determining an appropriate staffing level for an event, the staff management program 217 allows the users to change parameters and change the staffing levels of the event to accommodate specific needs or budgets.

The Shuttle Program

The shuttle program 218 allows for special treatment for "Shuttle" or "Hourly Service". Every user has the ability to group passengers based on the standard grouping parameters and principles. When the "Shuttle" or "Hourly Service" feature is selected, the user can elect to have the entire manifest grouped with hourly services or the option to optimize the service and cost based on the system suggesting when the hourly service fits best. When the group is managed by hourly services, the shuttle program 218 will take the first arrival or departure of the day and the last arrival or departure for the day and look at the travel time between each location, account for any load and unload time, any break time and create a solution that provides the rotation of the least amount of vehicles at the most cost effective price to perform a constant loop from airport to destination. Once the shuttle program 218 provides the output, the user can modify or change the settings until the desired output is achieved. When the user elects to have the shuttle program 218 optimize the grouping based on a combination of standard grouping and "Shuttle Service", the shuttle program 218 will require the user to determine the least amount of people to be transported within a set time threshold and the shuttle program 218 will calculate when the suggested times and vehicles shuttle service should be utilized. In this manner, a hybrid or combination of shuttle and assigned pick-up can occur.

The Terminal Logic Program

The terminal logic program 219 allows the user to utilize the terminal logic built into the system that displays each airport in the country and the terminals within each airport. Each Administrative user will have the ability to override any of the default information and manage the terminal logic as it applies to their particular needs. The terminal logic may include airline assignments for each terminal.

The Pricing Program

The pricing program 220 has the unique ability to import data, specifically pricing and rates for various transportation tools (e.g., sedans, limousines, SUV's, vans, minibuses, and motor coaches, etc.) and services (e.g., shuttle services, guided tours, etc.) that can be loaded and stored in the system for purposes of comparative analysis or forecasted budgeting. The pricing program 220 allows pricing from any airport to any zip code within the United States to be imported into the system in a matter of minutes. By default, the pricing program 220 has rates stored for the entire country that can be accessed within the system.

The Budget and Forecasting Program

The budget and forecasting program 221 provides a tool designed to budget and forecast prospective group movements. The budget and forecasting program 221 may create a non-real event, e.g., a sample, exemplary or dummy event, wherein the non-real event information can be used to forecast, budget, estimate and plan a real event. Utilizing historical data, the budget and forecasting program 221 allows a user to identify the most cost effective place to have an event. For example, if a user wanted to compare how much it would be to have a meeting in Chicago or Los Angeles, the budget and forecasting program 221 would review and analyze historical results that would help determine a projected cost of a group movement.

In one embodiment, the budget and forecasting program 221 is architected to provide a turkey system solution. The initial phase would be the planning phase that looks to identify market pricing. This is where a user can determine the best city to plan an event based on current and historical pricing and actual previous event history. This process could include airline hotel, ground and other costs. The next step would be to forecast the associated costs of an event once a destination city has been selected. The forecast will take the initial passenger manifest and group all passengers in the most cost effective manner with the desired settings of the end user. This process can be repeated numerous times with all of the additions, changes, and cancellations.

The Invoicing Program

The invoicing program 222 allows users to generate specific invoices for events that have been processed or to bill advances or bill for future events. Various other types of invoices may also be produced with the system as needed. Typically in the industries such as conference, transportation, travel, ground transportation, invoices are created with specific logos and identifications. The invoicing program 222 allows the user to browse through images that are available either within the event management system 100 or external to the event management system 100. When an appropriate image is located it may be placed in the logo format for use by the system. If the logo is external to the system, the invoicing program 222 allows the logo to be uploaded and stored in the event management system 100 either temporarily or on a more permanent basis. Once a logo is uploaded and available, a user may generate any of many types of invoices with the logo. These invoices may be created in a variety of computer formats including an HTML format as well as Excel spreadsheet format or Word format.

The Data Visualization Program

The data visualization program 223 allows a user to view chart-based graphical representations of various statistics and customize displays and charts relating to an event. For example, the data visualization program 223 may offer the ability to display information from each manifest in various charts that depict the following: arrivals by time of day for a single airport or multiple airport; departures from a single location to a single airport or multiple airports; arrivals or departures by the time of day by various combinations of terminal, vehicle, VIP/Non-VIP, airline, flight number, domestic/customs pickups or drop offs and other information. In order to support these various display methodologies, the data visualization program 223 allows the user to enter various parameters and customize the particular displays.

The Versioning Program

The versioning program 224 allows users to save various versions of their event plan. Users may create events, edit events, and save various versions of the event management plan. In this way a user may save alternative event plans for proposal or for other considerations. Once a particular plan is chosen to be executed, then other versions of the plan may be deleted or simply saved in the system for future reference by this user or other users.

Computer Program Products

Also disclosed are computer program products that assist in event management and organize flight information and ground transportation for airline passengers attending the event. One embodiment relates to a computer program product for assisting in event management. The computer program product includes a computer readable medium and computer readable code embodied on the computer readable medium for event management. The computer readable code includes computer readable program code devices configured to enable a processor to obtain information about an event including an event name, a sponsor, and a location; computer readable program code devices configured to enable a processor to convert a passenger manifest from one format to another; computer readable program code devices configured to enable a processor to change the converted passenger manifest; computer readable program code devices configured to enable a processor to effect a selection of vehicle types and capacity of vehicles; computer readable program code devices configured to enable a processor to categorize passengers into groups and identifying an expected service time by processing flight information, the vehicle types, and the vehicle capacity; computer readable program code devices configured to enable a processor to effect storing of passenger information and the passenger groups; computer readable program code devices configured to enable a processor to forecast a budget based on a price for the movement of one or more of the vehicle types; and computer readable program code devices configured to enable a processor to effect the display of the forecast budget and information about the event.

In certain embodiments, the computer program product for assisting in event management may further include computer readable program code devices configured to enable a processor to manage staffing of the event, computer readable program code devices configured to enable a processor to effect storing of multiple versions of data related to the same event, and/or computer readable program code devices configured to enable a processor to generate diagram/chart relating to the event for visual display.

Another embodiment relates to a computer program product for organizing ground transportation of airline passengers attending an event. The computer program product contains a computer readable medium and computer readable code embodied on the computer readable medium for organizing ground transportation of airline passengers attending an event. The computer readable code includes: computer readable program code devices configured to enable a data entry process that receives passenger data including names of passengers and flight information and stores the passenger data in an application specific format; computer readable program code devices configured to enable a group scheduling component that allows a user to set parameters including VIP status, time windows, vehicle types, and number of passengers allocated for vehicle type, and provides passenger groupings based on flight information and user-set parameters; and computer readable program code devices configured to provides a default setting if a parameter is not set by a user, to divides passengers into a VIP group and a non-VIP group based on VIP status of passengers, and processes the VIP group first.

In certain embodiments, the computer program product for organizing ground transportation of airline passengers attending an event may further include computer readable program code devices configured to enable a what-if-analysis process that provides passenger groupings and cost associated with each grouping based on a number of commonly used parameter settings and/or computer readable program code devices configured to enable a grouping process based on a shuttle service that runs on a fixed time schedule.

Another embodiment relates to a computer program product for organizing flight information for passengers attending an event. The computer program product includes a computer readable medium and computer readable code embodied on the computer readable medium for organizing flight information for passengers attending an event. The computer readable code includes: computer readable program code devices configured to enable a synchronization process to map passenger information from a user format into an application specific format and stores mapped passenger information; and computer readable program code devices configured to enable a process to validate flight information in stored passenger information. The synchronization process includes: scanning passenger information in the user format, identifying headers specifying required information, and assigning headers to required information that does not have a header. The required information includes passenger name and flight information.

EXAMPLES

Figure 5A:
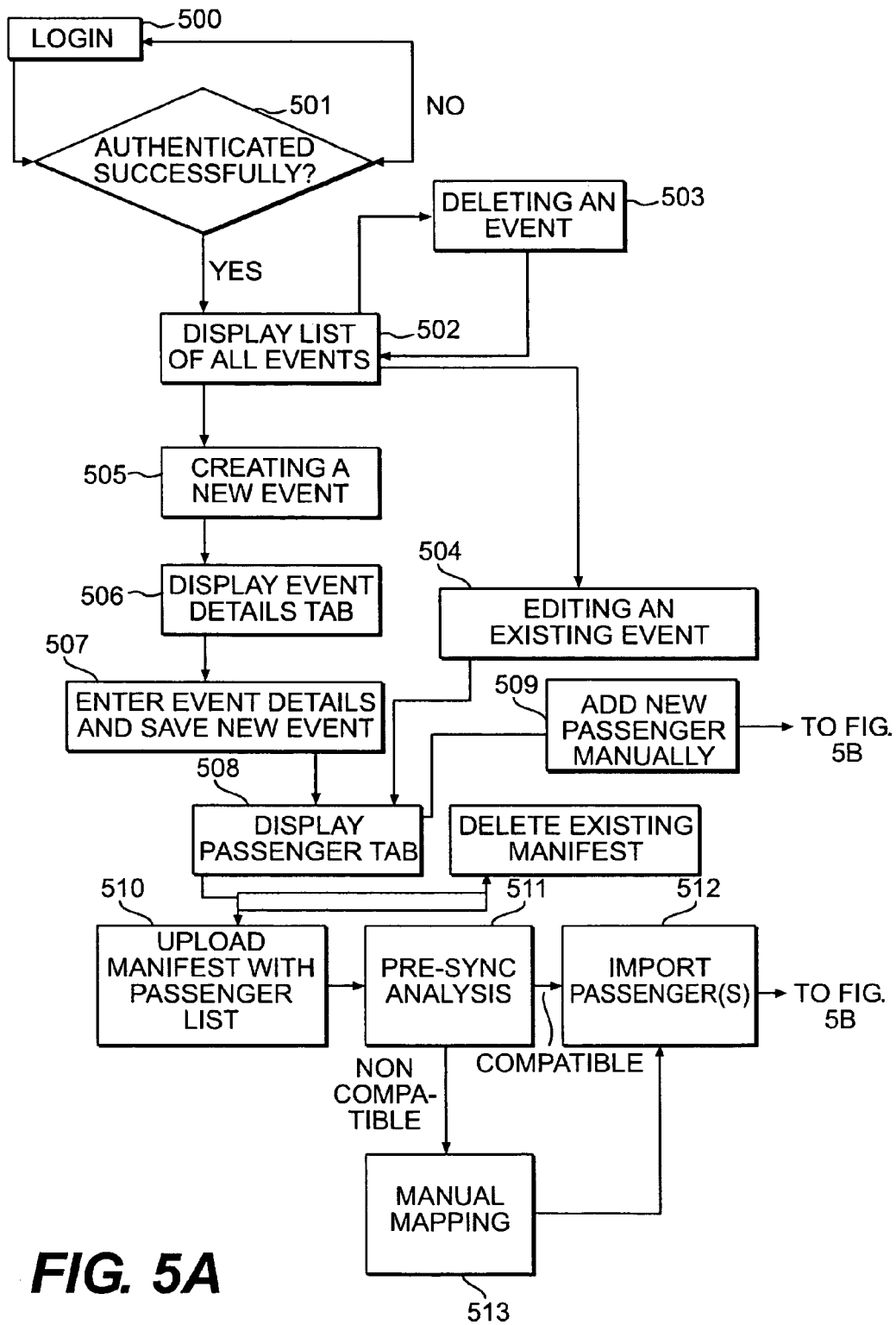
FIGS. 5A-5B show an example of sequences for the event management system.
Figure 5B:
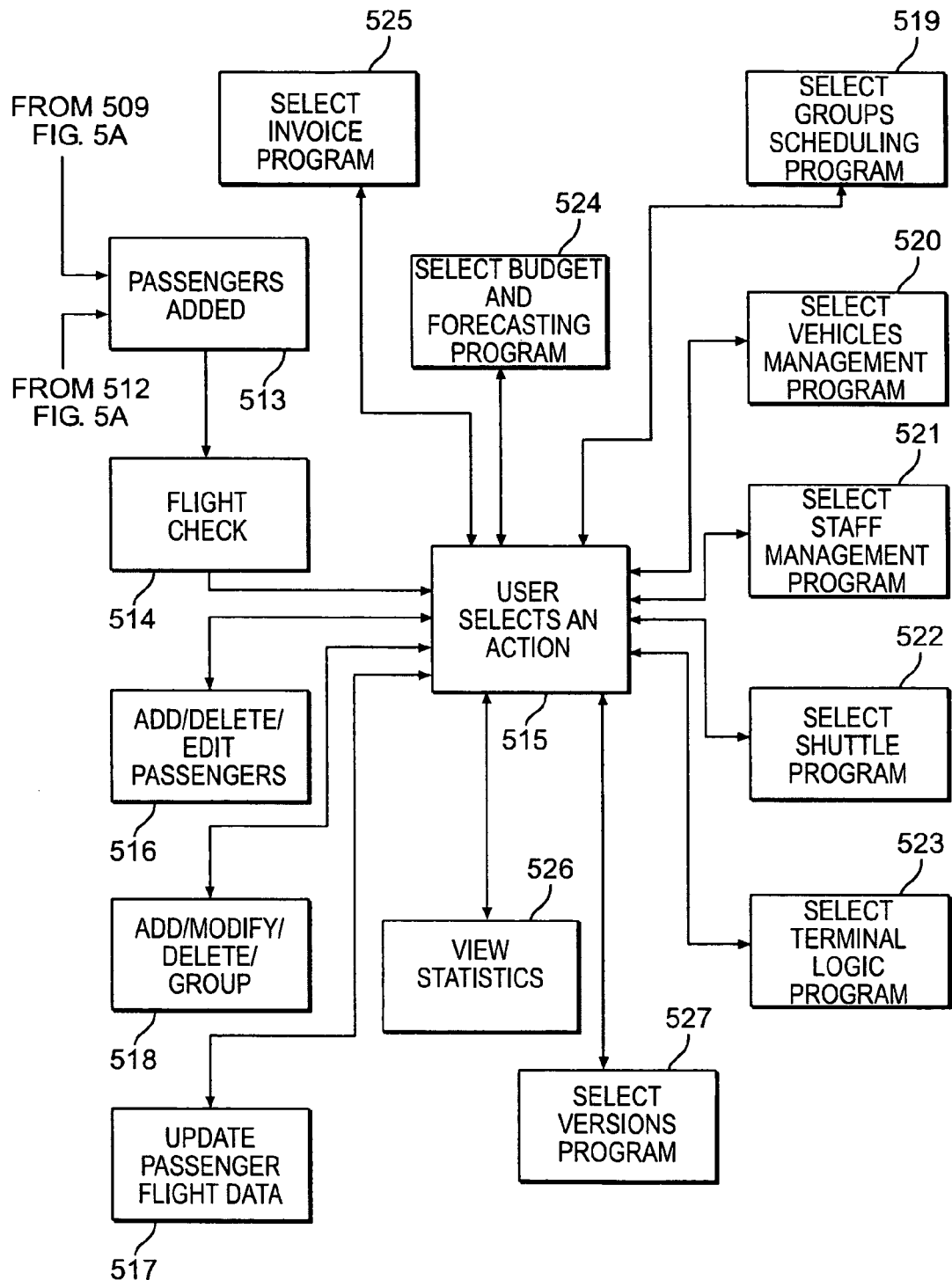

FIGS. 5A-5B shows an example of one intended utilization of the event management system 100. Referring now to FIG. 5A, the user starts by logging into the system as shown in "Login" subroutine 500. If the user does not successfully authenticate in "Authentication" subroutine 501, the user is returned to the login as shown in "Authentication" subroutine 501. If the user does successfully authenticate in "Authentication" subroutine 501, the system displays a list of all events accessible to that user account as shown in "Display Events List" subroutine 502. The user can delete an event as shown in "Delete Event" subroutine 503, after which point the user is returned to the "Display Events List" subroutine 502. The user can also create a new event as shown in "Create A New Event" subroutine 505. After creating a new event; the system displays the event details tab as shown in "Display Event Details" subroutine 506. The user then enters the details for the event, such as destination address and primary contact information, as shown in "Enter Event Details" subroutine 507. A user may also edit an existing event as shown in "Edit Existing Event" subroutine 504. Once a user has entered the event details for a new event as shown in "Enter Event Details" subroutine 507 or edited an existing event as shown in "Edit Existing Event" subroutine 504, the user is brought to the passenger tab as shown in "Passenger Tab" subroutine 508. The user may add passengers into the system manually as shown in "Add Passengers Manually" subroutine 509. Alternatively, the user may upload a manifest containing a list of all of the passengers as shown in "Upload Passenger Manifest" subroutine 510. The unloaded manifest is then examined by the "Pre-Sync Analysis" subroutine 511. If the manifest is in a format compatible with the system, the passengers are imported into the system as shown in "Import Passengers" subroutine 512. If the manifest is in a format not compatible with the system, the manifest is synchronized in the "manual mapping" subroutine 513 and then imported into the system as shown in "Import Passengers" subroutine 512

Referring now to FIG. 5B, whether the user added passengers manually as shown in "Add New Passengers" subroutine 509 or imported the passengers as shown in "Import Passengers" subroutine 512, the passengers are now added into the system as shown in "Passengers Added" subroutine 513 and validated by the system through the "Flight Check" subroutine 514. The user now selects an action as shown in "User Selects Action" subroutine 515. The user may add, delete or edit passenger information in "Add/Delete/Edit Passengers" subroutine 516. The user may update flight data in "Update Passenger Flight Data" subroutine 517. The user may start grouping passengers using the "Groups Scheduling Program" subroutine 519 or, if the passengers have been grouped in a previous session, automatically and manually manipulate groups for the passengers in "Add/Modify/Delete group" subroutine 518. The user may also add, modify and delete vehicle types, capacities, inventories and pricing rates in "Vehicle Management Program" subroutine 520. The user may add, modify and delete staff allocated for the event in "Staff Management Program" subroutine 521. The user may arrange for shuttle services in "Shuttle Program" subroutine 522. The user may obtain airport terminal information using "Terminal Logic Program" subroutine 523. The user may evaluate the cost of the transportation plan using the "Budget and Forecasting Program" subroutine 524. The user may also view and save the invoice for the event as shown in "Select Invoice Program" subroutine 525. The user may also view event statistics as shown in "View Statistics" subroutine 526. Finally, the user may save or edit different versions of the event as shown in "Select Versions Program" subroutine 527.

FIGS. 6A-6I are screen shots of an embodiment of an event management system 100. Many different types of screens, screen formats and data arrangements can be used with the event management system 100. Various use and combinations of color, icons and buttons can be applied in different embodiments of the event management system 100.

In this embodiment, the event management system 100 is installed on a user computer and is supported by the Web Application Server 112 and Database 113 as shown in FIG. 1A. After the installation, the system may be initialized from an existing program, such as Excel. In one embodiment, the system is designated as "Manifest Optimization Solution (MOS)" and can be launched by clicking an "MOS" tab in an Excel tool bar. A user may log in the system use a username/password combination.

An event screen will be displayed by the system after login. The user may select an existing event or a new event. If the login is an administrative login, the user can see all events from all accounts. Otherwise, the user can see only events associated on his account. From this page the user can delete, create, or edit an event. If the user selected a new event, the screen allows the user to enter and save details of the event. Each event is assigned an identification number for future reference.

After the event screen, the user can now import a manifest from a location in the user's computer into the system. The imported manifest will be subjected to a pre-sync analysis. The user may click on an "OPEN" button in the open Excel sheet, navigate to the location of the manifest the user wish to import, and double click the manifest to load it into the system.

Figure 6A:
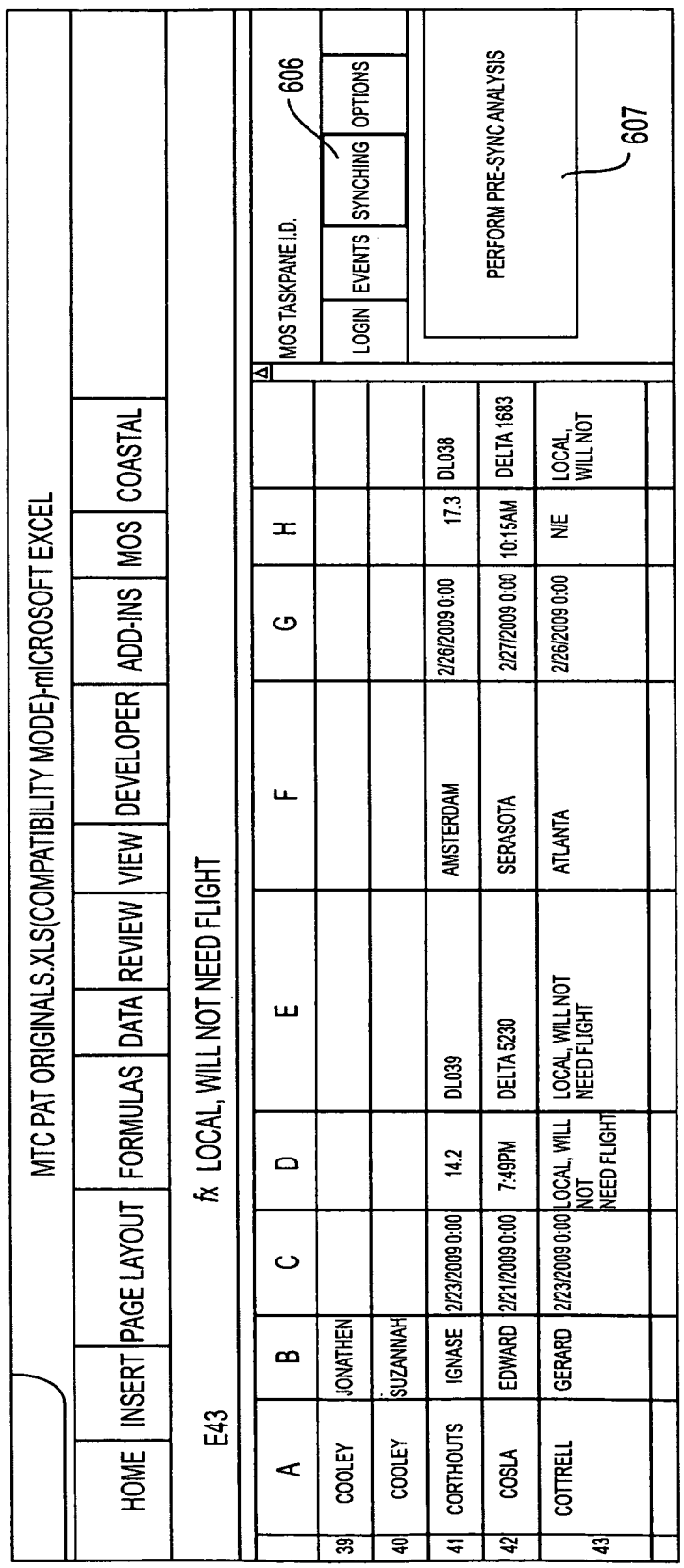
Figure 6B:
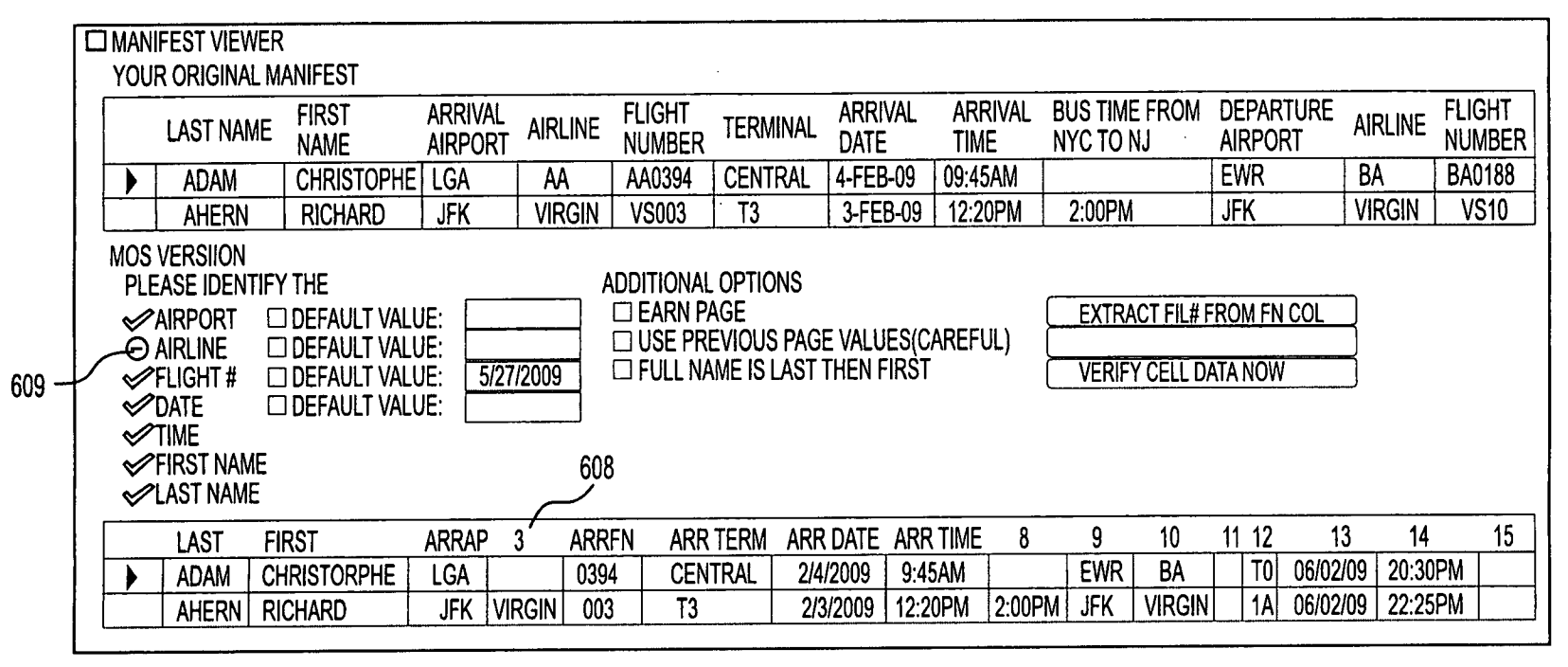
Figure 6C:
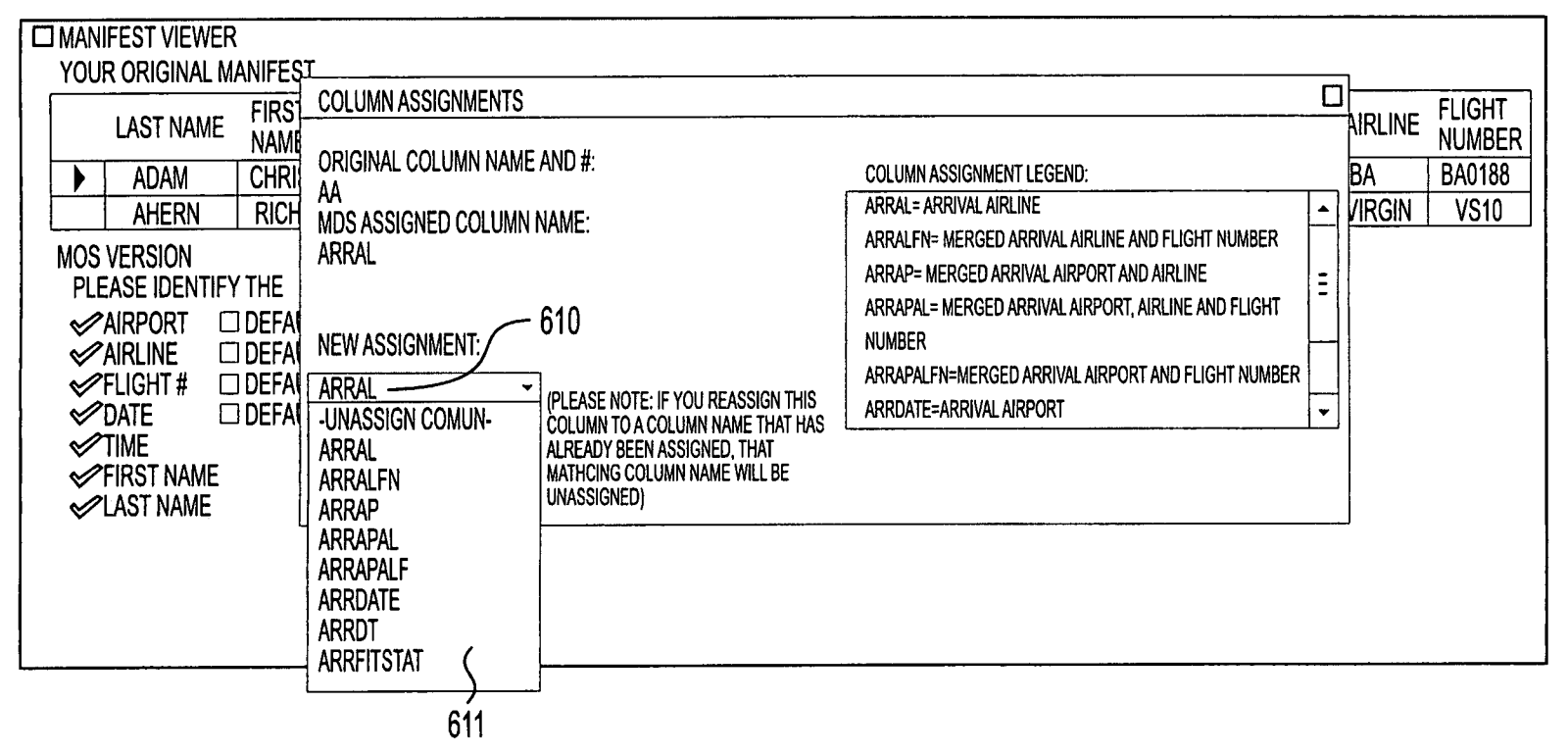

FIG. 6A shows a screen for performing a pre-sync analysis to verify that the manifest contains the data requirements to be processed through the system. The pre-sync analysis may be initiated by click on the "Syncing" tab 606 to highlight it. After selecting the Syncing tab 606, the user may press the "perform pre sync analysis" tab 607 to start the process. The system will guide the user through the data verification process. For example, FIG. 6B shows a manifest with a missing header for arrival airline. The missing header 608 is indicated be a "−" sign 609 in the check list shown on the left side of the screen. To correct the problem, the user may re-assign the column by clicking on the column header 608, and select the correct header 610 (ARRAL) from a pull down list 611 (FIG. 6C).

The system will need to validate the following criteria: arriving and departing airport, airline, flight number, date and time of the flight, first name and last name. The system will search all the information on the manifest. A manifest that passes Pre Sync Analysis will have green checkmarks on all required criteria. If all criteria received a green checkmark, the system will proceeds to Sync options. The Sync options may include an "Extra Passengers" option to allow attendees to add the guests traveling with them; a "Use Previous Passenger Values" option to use the same information entered for the prior traveler; a "Full Name is Last then First" option for manifests having the passenger's first and last name in the same cell; a "Convert Airline Names to Codes" option to translate airline names, i.e. American Airlines to the IATA code of AA; an "Extract Flight number from FN Column" option if the flight number (FN) column has additional non flight number related data in it; and a "Verify Cell Data Now" option to re-validate any data a user have modified or added.

The Sync options may also include sync manifest options, such as a "Merge Passengers" options that can be used to merge modifications or additions to a current manifest; a "Replace Passengers" option that can be used to overwrite the entire passenger list; an "Add Passenger" option that can be used to add a defined list of new passengers to a current manifest; and a "Delete Passengers" option that can be used to delete a defined list of passengers a user wish to remove from the manifest.

After the completion of the Pre-Sync process, a user may press the Sync Now button 612 (FIG. 6D) move to the data to the Flight Check process. The user may open an "Event Viewer" window that allows the user to produce grouping options and publish manifests and budget templates. FIG. 6E shows a "Manage Passenger" sheet that allows a user to edit the specific passenger details and assign different priority status. For example, from the Manage Passenger page a user may navigate to a flight check screen by hovering the mouse over the Build Passenger tab 615. This will display a new list of options including a "Check Flights" option. The user may select the "Check Flights" option and set in a "Flight Update Time Window" to an acceptable tolerance that the user wants the system to allow for an adjusted arrival time vs. the client provided estimated arrival time.

Once a user has entered the desired time frame into the "Flight Update Time Window," the user may initiate the Flight Check process. Once the flight check is complete, the user may review the Event viewer (FIG. 6F) for any non validated flight issues 619. If issues are identified, the user may select the "Show/Hide Export Options" 620 to generate a consolidated list for correction.

The system also allows the user to group passengers using an "Assign Passengers to Vehicle Groups" function. Once in the "Assign Passengers to Vehicle Groups" screen (FIG. 6G), the user may begin the process of assigning time parameters, vehicles to be utilized, vehicle capacity and passenger priority. Time window 623 defines the time you are willing to have passengers wait between groupings. Pickup Time Buffer 624 defines the time difference between either flight arrival or departure and the time the travelers are to be scheduled for pick up. The user can move the time forward for airport pickups and this is particularly useful for differentiating the time for Domestic and international arrivals. For Departures, the user would determine the amount of time the user want to have the clients at the airport plus the travel time to the hotel.

Figure 6H:
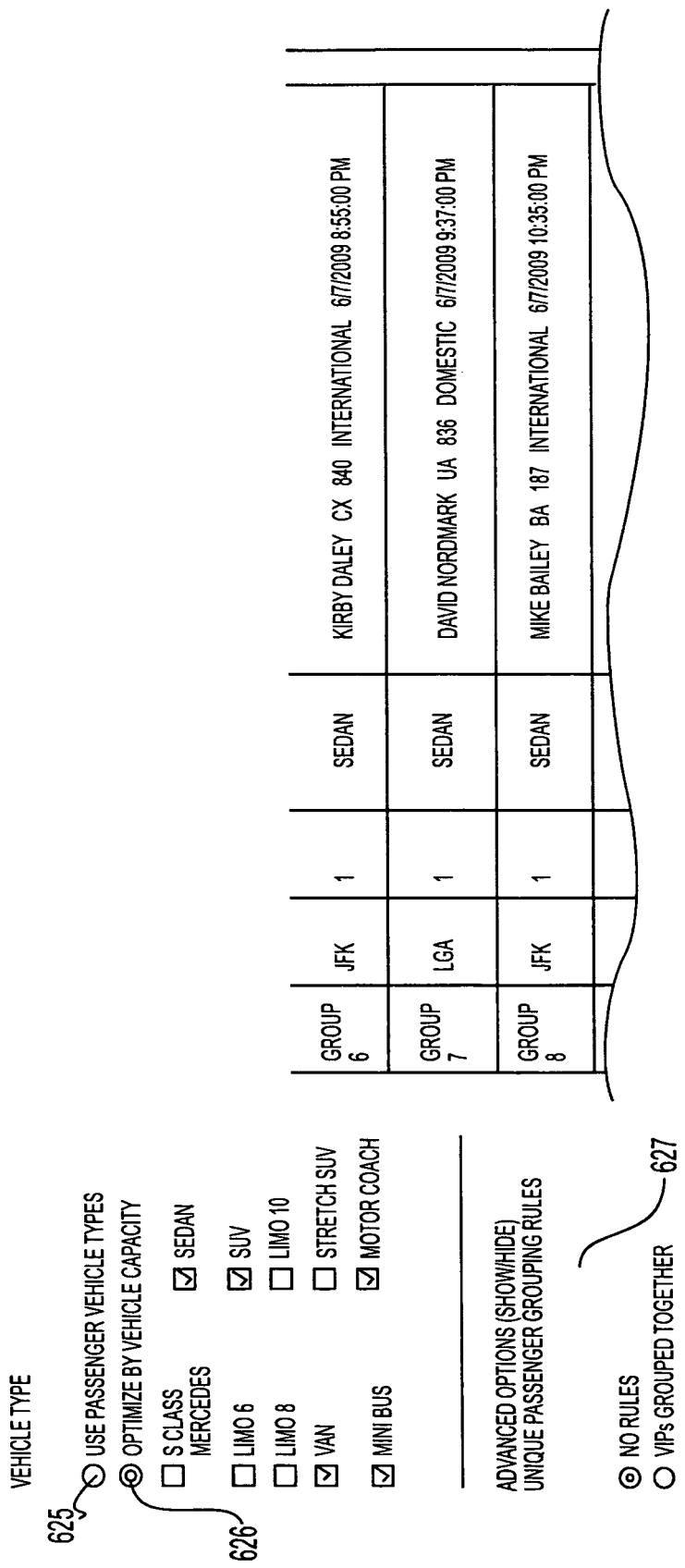

FIG. 6H shows a vehicle assignment screen that allows a user to either select the "Use Passenger Vehicle Types" tab 625 (uploaded from the original manifest) or "Optimize By Vehicle Capacity" tab 626. The selection allows the system to optimize the vehicle selection process and assigning the correct vehicle based on the time parameters and selected vehicle choices. Based on the tone the user wishes to set for the event, the user can select the appropriate vehicle type by placing a check mark in the vehicles the user wishes to use. The Unique Passenger Grouping Rules section 627 allows a user to keep all passengers with the same status, or separate VIPs. The VIPs will be placed in their own vehicle regardless of flight and arrival time frames.

Figure 6I:
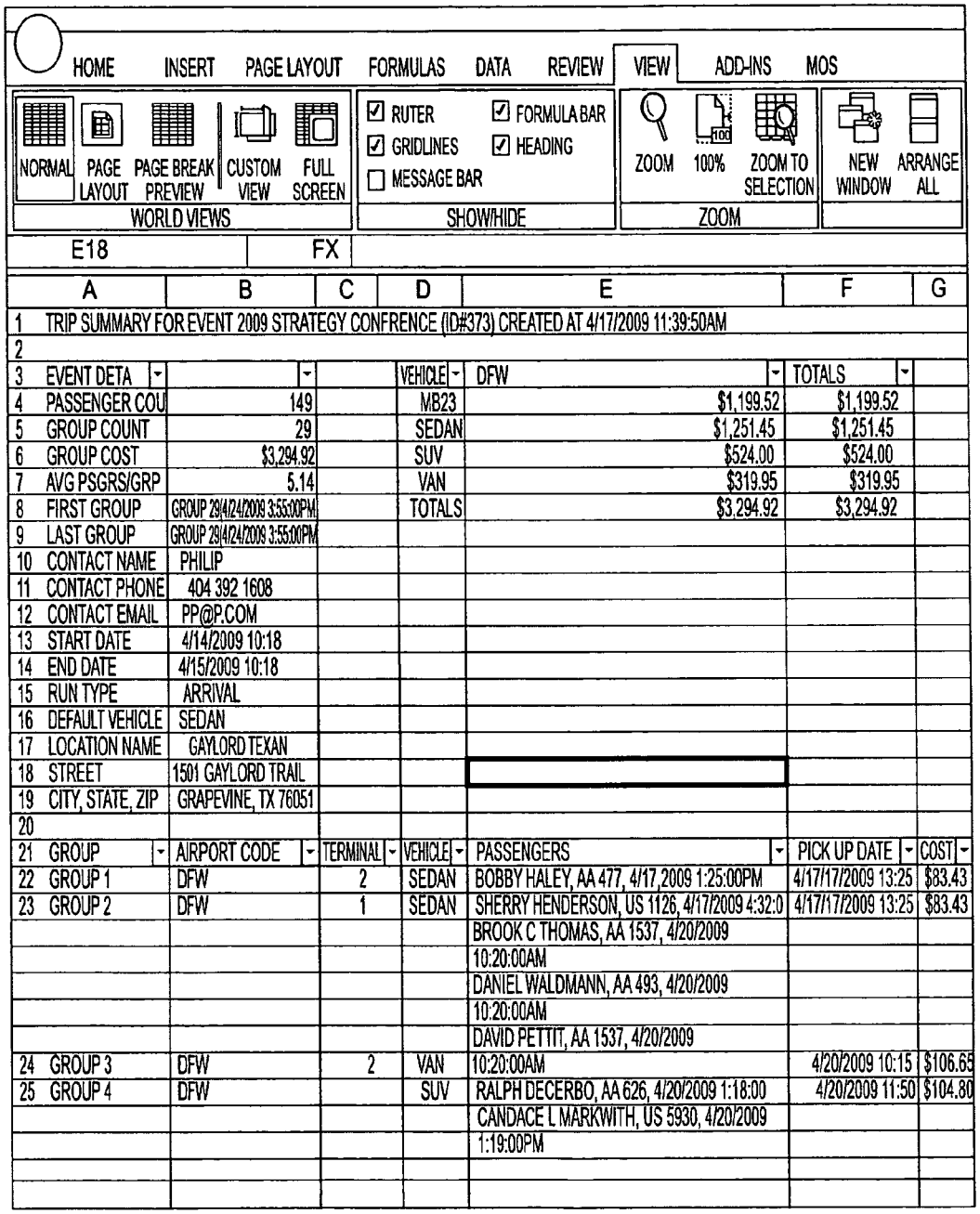

The system will produce the groupings based upon the user's selections. The user can repeat the process and change the rules until a desired result is reached. Once the user achieves a satisfactory result in the "assign passengers to vehicles" process, the user can publish the results back to the initial spreadsheet as shown in FIG. 6I. The user can create variations of the report by simply changing the vehicles to be utilized, the passenger capacity by vehicle and the amount of wait time used for grouping frequency. The user must save the new settings prior to exporting additional reports. Once the user is satisfied with the structure of the groupings, the user can forward the report to clients for review.

FIGS. 7A-7H are screen shots of another embodiment of an event management system 100. Many different types of screens, screen formats and data arrangements can be used with the event management system. Various use and combinations of color, icons and buttons can be applied in different embodiments of the event management system.

FIG. 7A shows the first screen displayed by the system after login. Each screen after the login screen shows an "Administrative Tools" section 701 with links to "Events" 702, "Users" 703, "Airports" 704, and "Airlines" 705. These links lead to screens containing information regarding the events in the event management system. These links appear on most of the screens in the system in order to provide the user with ease of navigation within the system.

The screen shown in FIG. 7A is the "Events" page. After login, a user sees a list of all previously created events as well as any events that are in the process of being created. If the login is an administrative login, the user can see all events from all accounts. Otherwise, the user can see only events associated on his account. From this page you can delete, create, or edit an event. In this embodiment, each event is assigned a name, a customer, a start date and an end date. The first event shown is called "Medical Advisory Group." The customer associated with this first event is "GEP South Florida." Each event is assigned a start date and end date, which are also listed on the event screen.

FIG. 7B shows the "Event Information" screen with the "Event Details" tab 706 selected. In this tab, a user may create a new event by a wizard-driven process that the user will follow to instantiate an event. The first step in the tab wizard involves filling out all the base event information, such as the location that the event will be held at, contact information, dates, etc. The location is used to estimate travel distance and time, as well as cost. If the user logged in as an administrator, the user can see all customer names, otherwise the customer name is fixed and cannot be altered except by an administrator.

In particular, in this embodiment, the new event screen allows for entry or assignment of data to an event. Specifically, in this embodiment, a user may enter a customer name, event name, event code, start date, end date, contact name, contact phone number, event type, default run type, various options, textual description of the event, default vehicle type, and location drop-off. Also, in this embodiment, the location drop-off includes: location name, street number street name, and cross street. This screen may be used to enter various other information related to an a proposed or actual event.

The "Event Information" screen may be used to upload, add or export passenger information. More particularly, once an event is created, a new tab in the wizard appears where the user can upload new passengers. This step typically involves uploading manifest in excel or other format and mapping the fields in the manifest (e.g., Excel file) to the fields in the event management application. The system allows the user to browse or select a file to upload, into the event management system.

Various methods exist for mapping (i.e., synchronizing) the manifest data into the application. The user preferably makes a conversion map available to the system. In one embodiment, the following methods are made available to the user for providing a map: selecting an "Auto Scan Maps for Match" to have the application try to determine the appropriate map for the manifest; selecting an existing map that appropriately maps the manifest; editing an existing map; or creating a new map. The "Auto Scan Maps for Match" routine will scan maps that the system has access or is aware of in order to find an appropriate map to use for the conversion of the data.

FIG. 7C shows a view of the "Event Information" screen after a passenger manifest has been uploaded and accepted. In this view of the Event Information screen, shown are various tabs with corresponding screens such as, "Event Details" 707, "Passengers" 708, "Groups" 709, "Vehicles" 710, "Staff" 711, "Versions" 712, "Generate Invoice" 713, and "View Statistics" 714. Shown is the Passengers screen. A notice (in red) will appear indicating that the flight status for the passengers has not been validated. Each passenger's flight status is shown in the "Flight Status" column. Initially, all status's are set to unknown. Various portions of these screens can be color coded. On this screen, the unknown status indicator is preferably color coded to highlight the item for the user.

Upon selecting "Update Flight Times" 715 on the "Event Information" screen, the passenger flight data will be validated and updated to the most current information from the airlines. A processing circle, clock, hour glass or similar icon may be used to show the user that the flight validation program is in process. In use, the flight validation process takes about 5 seconds to initialize, and then about 1.5 seconds per flight check. After flight validation, the Flight Status column in FIG. 7C will change from "unknown" to "updated."

FIG. 7D shows a "Passenger" screen where the user can update passenger information. Using this screen, the user may edit a passengers information or status. In this example, the user has updated the passenger's status to VIP 716. Any passenger information entered, converted or uploaded in the event management system may be changed. In this embodiment, any one of the passenger parameters shown may be changed including name, VIP site inspector, priority, vehicle type, airport, terminal, airline, flight number, arrival date, arrival time, flight status and pick-up. The user selects "Update Passenger" on this screen and the updates are saved. The user can also alter and revalidate/update the flight data.

Referring again to FIG. 7C, selection of "Groups" tab 709 allows users to schedule groups, add new groups, delete groups, and export groups to a spreadsheet program. The user may selects the Groups tab 709 and then the "Schedule Groups" within the Groups tab 709 to begin computing the groups. The computing process involves auto-assigning the passengers to groups. Initially, the passenger vehicle type is used.

Figure 7E:
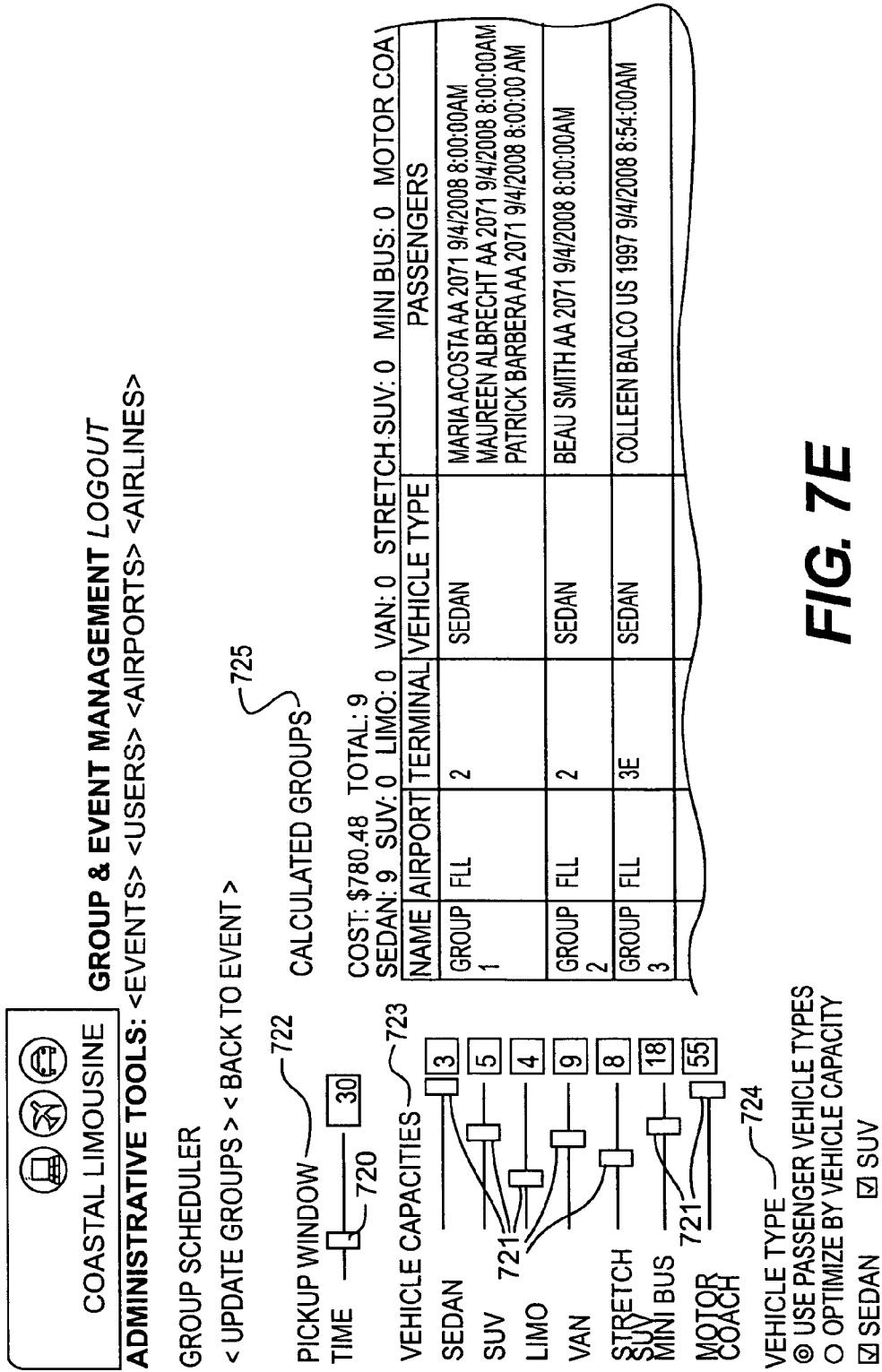

FIG. 7E shows a "Group Scheduler" screen that provides a "Pickup Window" section 722 for specifying a pick up time window for each group, a "Vehicle Capacities" section 723 showing sedans, SUVs, Limos, vans, stretch SUVs, mini buses, and motor coaches as the vehicle options, and a "Vehicle Type" section 724. In this embodiment, the "Pickup Window" section 722 contains a sliding bar 720 that allows a user to increase or decrease the length of the pick up time window by moving the sliding bar 720 towards right or left, respectively. The "Vehicle Capacities" section 723 allows the user to specify the number of passengers to be assigned to each type of vehicle. In this embodiment, the "Vehicle Capacities" section 723 also contains a plurality of sliding bars 721 that allow a user to increase or decrease the number of passenger assigned to each type of vehicle by moving the sliding bars 721 towards right or left, respectively. The maximum number of passengers a user may assign to a vehicle type equals the maximum passenger capacity of that vehicle type. The screens may also provide a section for "VIP Grouping Rules" (not shown) allowing the user to choose between not applying any rules to the VIP groups or grouping VIPs together or separately. The Vehicle Type section allows the user to select vehicle types that were previously designated for a passenger, or choose to optimize by vehicle capacity, which would automatically select vehicle types based on the number of passengers. The screen also shows a "Calculated Groups" section 725. The calculated groups each have designated airports, terminals, passenger lists, and vehicle types. The "Calculated Groups" section may also provide an estimated cost based on the grouping.

The user may change the settings in the "Pickup Window," the "Vehicle Capacities" and/or the "Vehicle Type" section. The changes will be automatically reflected in the "Calculated Groups" section with recalculated cost.

FIG. 7F shows the "Event Information" screen with tabs for screens displaying event details, passengers, groups, vehicles, staff, versions, invoices, and statistics regarding events. The "Groups" screen is shown with the option to schedule groups, add new groups, delete groups, or export groups to a spreadsheet program, such as Excel. The Groups screen also shows the name of each group, the airport, terminal, vehicle type, passengers, and pickup date/time/and location associated with each group.

FIG. 7G shows the "Event Vehicle" screen with a "Custom Rates" field 727 for inserting custom rates for vehicles. The fields in this example include "Event Name," "Customer Name," "Vehicle Name," "Vehicle Code," "Inventory," and "Capacity." For each vehicle type, a maximum, suggested and current number of passengers is given. Selecting the "Update Vehicle" tab 729, the user can update the vehicles to alter default capacities, insert custom rates, and alter vehicle names. In this example, no custom rates have been entered. The "Add Rate" section 728 allows users to add the rate for a vehicle in an event based on specific airports. This screen also allows the user update the vehicle or go back to an event via links.

FIG. 7H shows the "Event Information" screen with the "Groups" tab selected. The Groups tab allows users to schedule groups, add new groups, delete groups, and export groups to a spreadsheet program. The Groups screen also shows the group list with the associated airport, terminal, vehicle type, passengers, and pickup time, date and location for each group. After updating the groups and returning to the event, the new prices and costs are clearly shown.

The Group screens contain fields for "Group Name," "Customer Name," "Event Name," "Airport," "Terminal," "Pickup Date," "Pickup Time," "Group Time," "Window," "Vehicle Type," "Requested Chauffeur," "Max Capacity," (maximum number of passengers per vehicle) "Remaining Capacity," (remaining number of passengers per vehicle) "Price," "Distance," "Time," and "Directions" (for airport terminal for each group). In FIG. 7H, the screen shows a terminal map 730 of the Ft. Lauderdale Hollywood International Airport, for example.

FIG. 7I shows the "Event Staff" screen. This screen allows a user to create a profile for a staff member of an event. It provides fields for entering the event name, customer name, location, meeting point, worker type, cost, starting and ending dates and times, along with special requirements. In this example, the event name is "Tristar Medical Manifest," the customer name is "Tristar Worldwide," the worker type chosen is "Driver Greet" and the start time is 1 PM. This screen also provides links to update the worker or go back to the event.

The system also offers an "Admin User List" screen for providing a user with administrative functions. If the user is an administrator, he or she can edit, create, or remove accounts. In one embodiment, the user list shows "UserName," "Email," "password," "IsLockedOut," and "LastLoginDate" fields for information particular to each user. Each field is editable via an edit button. The "IsLockedOut" field shows whether or not a user is able to access the event management system.

The system may also produce an "Admin User Detail" screen for providing a user with the administrative functions of editing a user and assigning a new account to the user. In an embodiment, the screen has a user name field, and account field, an email field, and fields for entering passwords. The screen also provides links to update the user and to go back to the user list. In this example, the fields are filled in.

The system may produce an "Admin Airport List" screen for providing a user with a view of the Airport List. In this example, the airport list has an airport code that corresponds to an airport name. The codes and names can be edited by a link to an editing screen. In this example, buttons leading to the editing screen are provided on the Airport List.

The system may further produce an "Admin Airport Detail" screen for providing a user with the ability to edit an airport. In this example, there are fields for entering an airport name and a corresponding code. There is also a section on this screen for "Terminals." Each terminal can be edited. In this example, the terminal names have each have edit buttons that lead to a terminal editing page. The screen includes links to add terminals or delete terminals. The screen also provides links to update the airport and go back to the Airport List.

The system may further produce an "Admin Terminal Detail" screen for providing the user with an interface by which to edit a terminal. The screen has a field for entering the terminal name along with a list of airlines to select for each terminal. In this example, the airlines have boxes that can be selected or deselected as the user edits a terminal. A map of the airport for the terminal is also provided on the screen.

The system may produce an "Admin Airline List" screen for viewing the Airline List. The screen also provides links to add a new airline or delete an airline. Each airline is shown with a box that can be selected or deselected. The screen has columns for the name of the airlines and for a corresponding code. In this example, a user can edit each airline can be edited by selecting an edit button.

The system may further produce an "Admin Airline Detail" screen for providing a user with the ability to edit an airline. In this example, the screen provides fields for entering the name of the airline, code of the airline, and designating whether a flight is international or domestic. The screen also provides links to update an airline and to go back to the Airline List.

The embodiments described above are created for the Event Management and Ground Transportation industry, but the open architecture and extensible, rules-based design of the workflow engine allow it to be utilized in other industries or markets that can benefit from the automated, optimized grouping, sorting and routing of entities (be they human travelers, crates of produce, boxes of equipment, etc.) that are distributed via ground transport vehicles.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. An event management system which includes computer processors for use in the travel industry comprising:
   a memory;
   a computer display;
   an event creation component, wherein a new event is identified including a name of the event, a sponsor of the event, a location, and a contact person for the event;
   a conversion mapping component, wherein passenger data including names of passengers and flight information is mapped from a user format into an application specific format;
   a passenger management component, wherein mapped passenger data is deleted and changed and wherein a new passenger is added;
   a vehicle management component, wherein vehicle types are selected and a capacity of passengers for a vehicle type is modified;
   a group scheduling component, wherein data is processed to assign passengers into computer selected groups and service times, wherein passenger flight information including arrival time and terminal of arrival, the vehicle types and the vehicle capacity for a vehicle type are processed to assign passengers into computer selected groups and service times accounting for time and terminal of arrival and controlling wait time;
   a staff management component, wherein staff are allocated to an event including greeters and drivers, wherein the staff's location and time of service are determined using the groups;
   a versioning component, wherein a first and a second version of the event including information on the groups is stored in the memory;
   an invoicing component, wherein invoices related to the event are generated; and
   a data visualization component, wherein information about the event is formatted for viewing on a computer and a signal carrying output data is sent to the computer display.

2. The system of claim 1, further comprising a flight validation component.

3. The system of claim 2, wherein the flight validation component operates automatically without a user prompt.

4. The system of claim 2, wherein the flight validation component makes a call to one or more computer systems over the internet to obtain flight information including flight schedule arrival time, flight status, any changes in flight arrival time, and arrival airport terminal.

5. The system of claim 2, wherein the flight validation component periodically checks flight status.

6. The system of claim 2, wherein the flight validation component highlights to users passenger flights that have been changed by the flight validation component.

7. The system of claim 2, wherein the flight validation component stores the date and time of the last flight check for a particular passenger manifest.

8. The system of claim 2, wherein the flight validation component further comprises an airport terminal assignment component, wherein passengers are assigned to airport terminals and airport terminal data is verified.

9. The system of claim 2, wherein the flight validation component allows an end user to obtain flight information without leaving the event management system.

10. The system of claim 1, further comprising a shuttle component that provides shuttle or hourly transportation services to the event.

11. The system of claim 1, further comprising a terminal logic component that is capable of display airport map and terminal maps within each airport.

12. The system of claim 1, further comprising a budget and forecasting component that allows creation of a non-real event with various desirable settings, wherein the non-real event information can be used to forecast, budget, estimate and plan events.

13. The system of claim 1, further comprising an event management component, wherein the event management component allows access to stored events and editing of stored events and wherein the event creation component works with the event management component.

14. The system of claim 1, wherein the vehicle management component comprises a rate entry and rate storage component.

15. The system of claim 4, further comprising a budget and forecasting component that allows creation of a non-real event with various desirable settings, wherein the non-real event information can be used to forecast, budget, estimate and plan events.

* * * * *